(12) United States Patent
Lillo

(10) Patent No.: US 11,560,046 B1
(45) Date of Patent: Jan. 24, 2023

(54) SCHOOL BUS EMERGENCY EGRESS SYSTEM

(71) Applicant: Michael A. Lillo, Willard, OH (US)

(72) Inventor: Michael A. Lillo, Willard, OH (US)

( * ) Notice: Subject to any disclaimer, the term of this patent is extended or adjusted under 35 U.S.C. 154(b) by 0 days.

(21) Appl. No.: 17/387,024

(22) Filed: Jul. 28, 2021

Related U.S. Application Data

(63) Continuation of application No. 16/831,192, filed on Mar. 26, 2020, now Pat. No. 11,097,603, which is a continuation-in-part of application No. 15/981,126, filed on May 16, 2018, now Pat. No. 10,639,972.

(60) Provisional application No. 62/635,847, filed on Feb. 27, 2018.

(51) Int. Cl.
| | |
|---|---|
| *B60J 5/10* | (2006.01) |
| *A61G 3/06* | (2006.01) |
| *B60G 17/052* | (2006.01) |
| *G07C 5/08* | (2006.01) |
| *B60P 1/43* | (2006.01) |

(52) U.S. Cl.
CPC ............. *B60J 5/108* (2013.01); *A61G 3/061* (2013.01); *B60G 17/0525* (2013.01); *G07C 5/0825* (2013.01); *G07C 5/0833* (2013.01); *B60G 2202/152* (2013.01); *B60G 2500/30* (2013.01); *B60P 1/431* (2013.01)

(58) Field of Classification Search
CPC ...... B60J 5/108; A61G 3/061; B60G 17/0525; B60G 2202/152; B60G 2500/30; G07C 5/0825; G07C 5/0833; B60P 1/431
See application file for complete search history.

(56) References Cited

U.S. PATENT DOCUMENTS

| | | | | | |
|---|---|---|---|---|---|
| 3,861,739 | A | * | 1/1975 | Kinney | B60R 3/02 49/141 |
| 5,169,205 | A | * | 12/1992 | James | B60J 9/02 49/141 |
| 6,484,344 | B1 | * | 11/2002 | Cooper | A61G 3/061 14/71.1 |
| 7,052,227 | B2 | * | 5/2006 | Navarro | B60P 1/431 414/537 |
| 8,991,842 | B1 | * | 3/2015 | Teno, III | B60R 3/02 280/163 |
| 10,040,385 | B2 | * | 8/2018 | Stevens | B60P 1/43 |
| 2006/0245883 | A1 | * | 11/2006 | Fontaine | A61G 3/067 414/537 |
| 2012/0279417 | A1 | * | 11/2012 | Charbonneau | B64D 25/08 14/71.1 |
| 2016/0137040 | A1 | * | 5/2016 | Eloff | B60J 5/0472 296/146.9 |
| 2017/0327022 | A1 | * | 11/2017 | Rasekhi | E01D 15/00 |
| 2019/0206046 | A1 | * | 7/2019 | Holloway | G06T 7/0004 |

* cited by examiner

*Primary Examiner* — Darlene P Condra
(74) *Attorney, Agent, or Firm* — Ralph E. Jocke; Walker & Jocke

(57) ABSTRACT

An emergency egress system for a multi-passenger vehicle such as a school bus (10) includes a housing (30) that operatively supports a ramp (34) in movable connection therewith. Opening an emergency exit door (18) of the bus causes a housing door (24) to open and the ramp to move outwardly from a retracted position toward an extended position. Opening the emergency exit door also causes the suspension of the bus to be automatically lowered to place the emergency exit opening (16) closer to the ground (166).

20 Claims, 28 Drawing Sheets

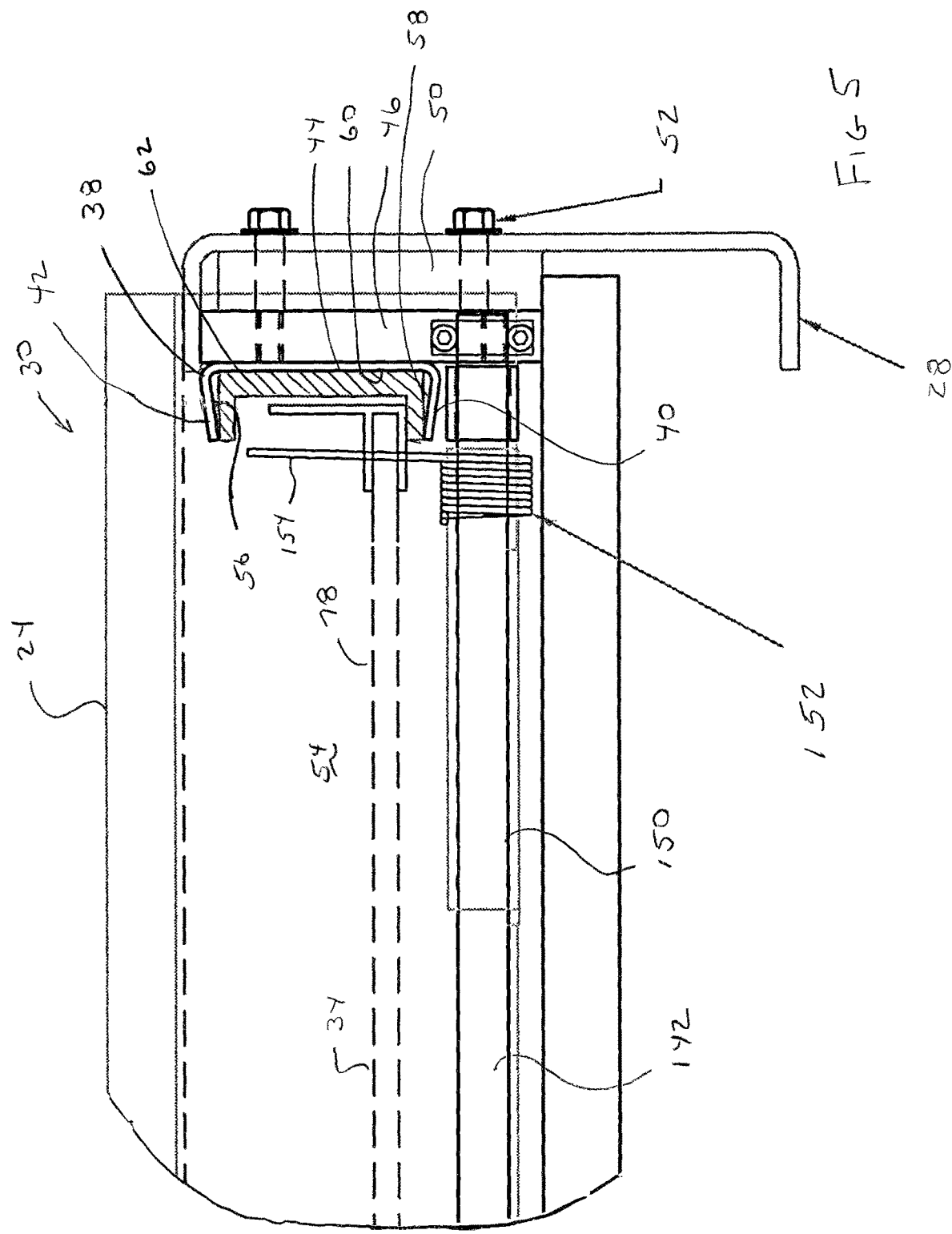

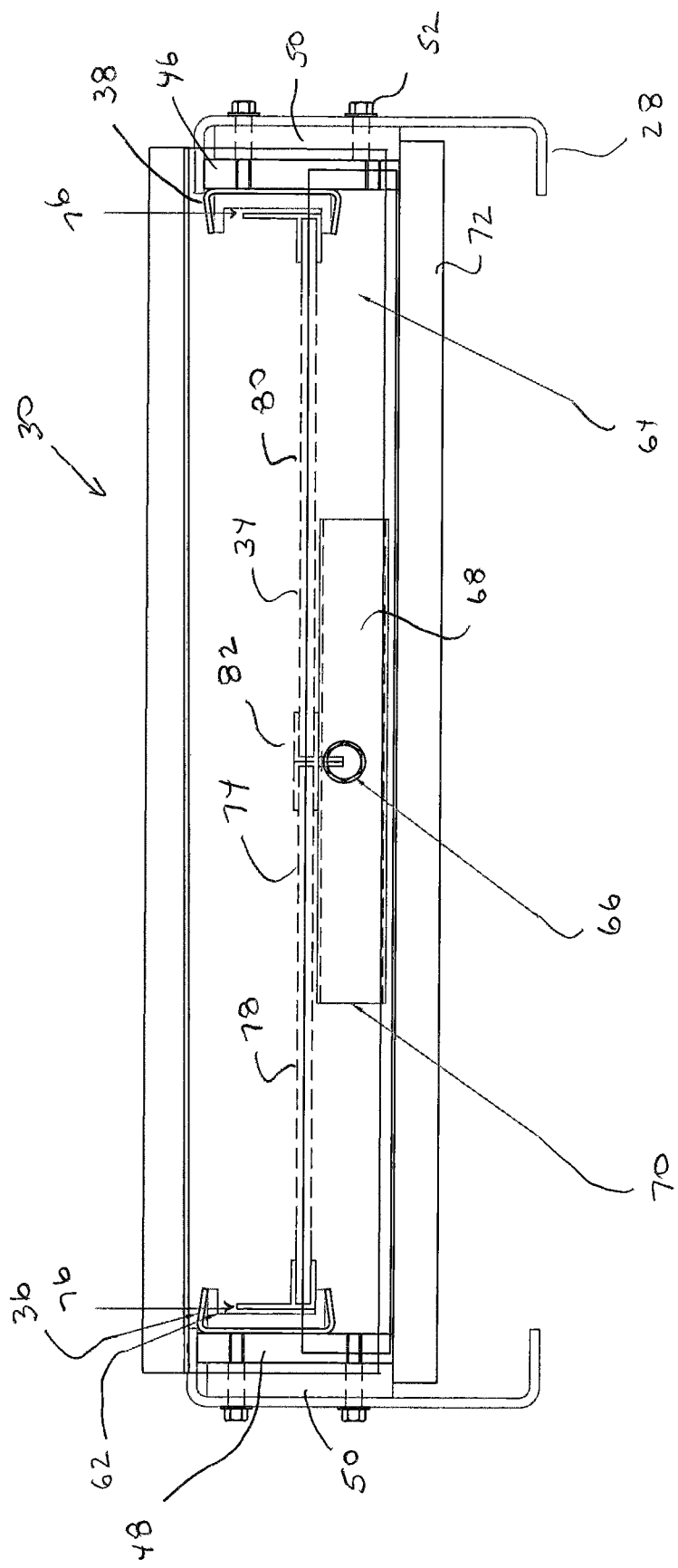

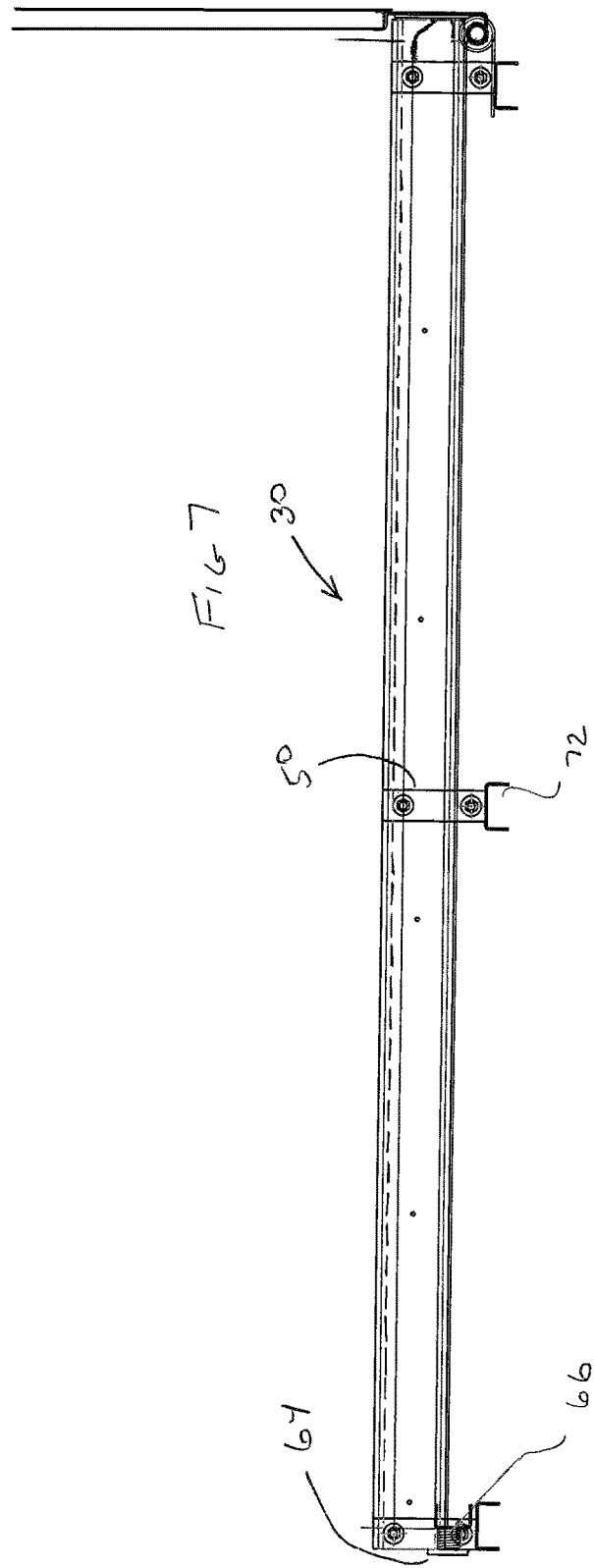
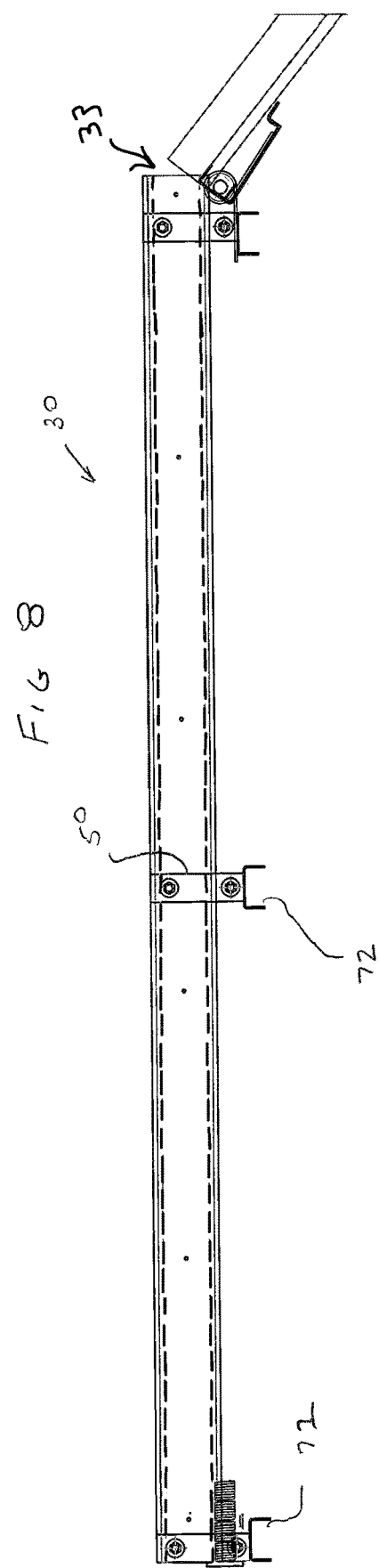

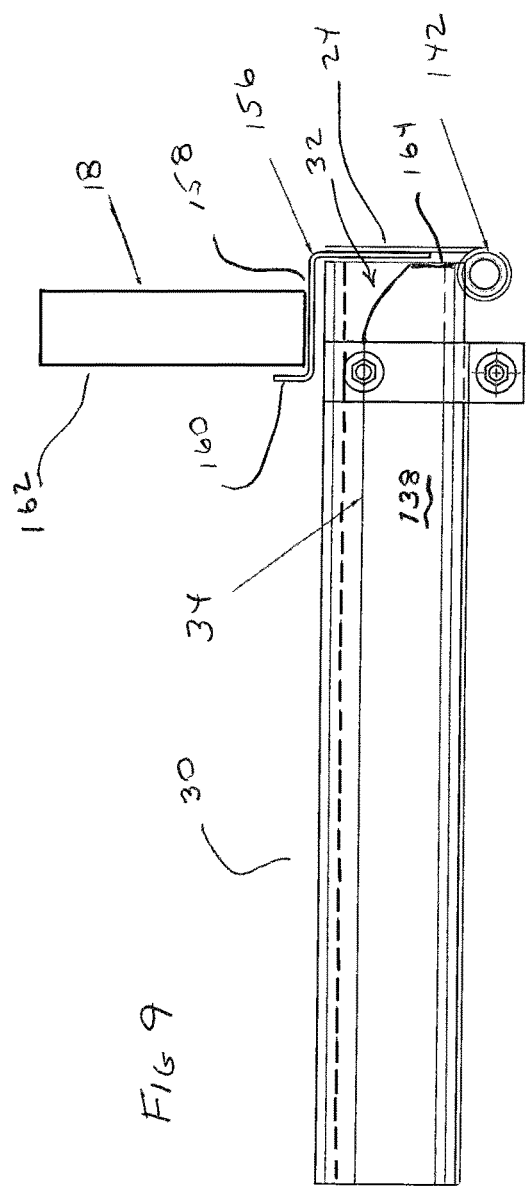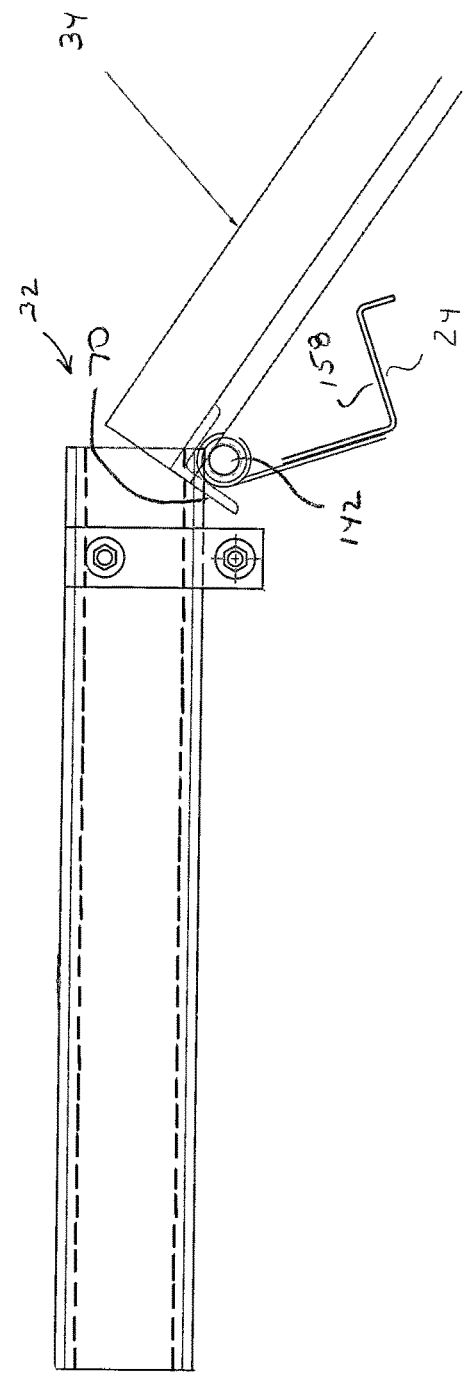

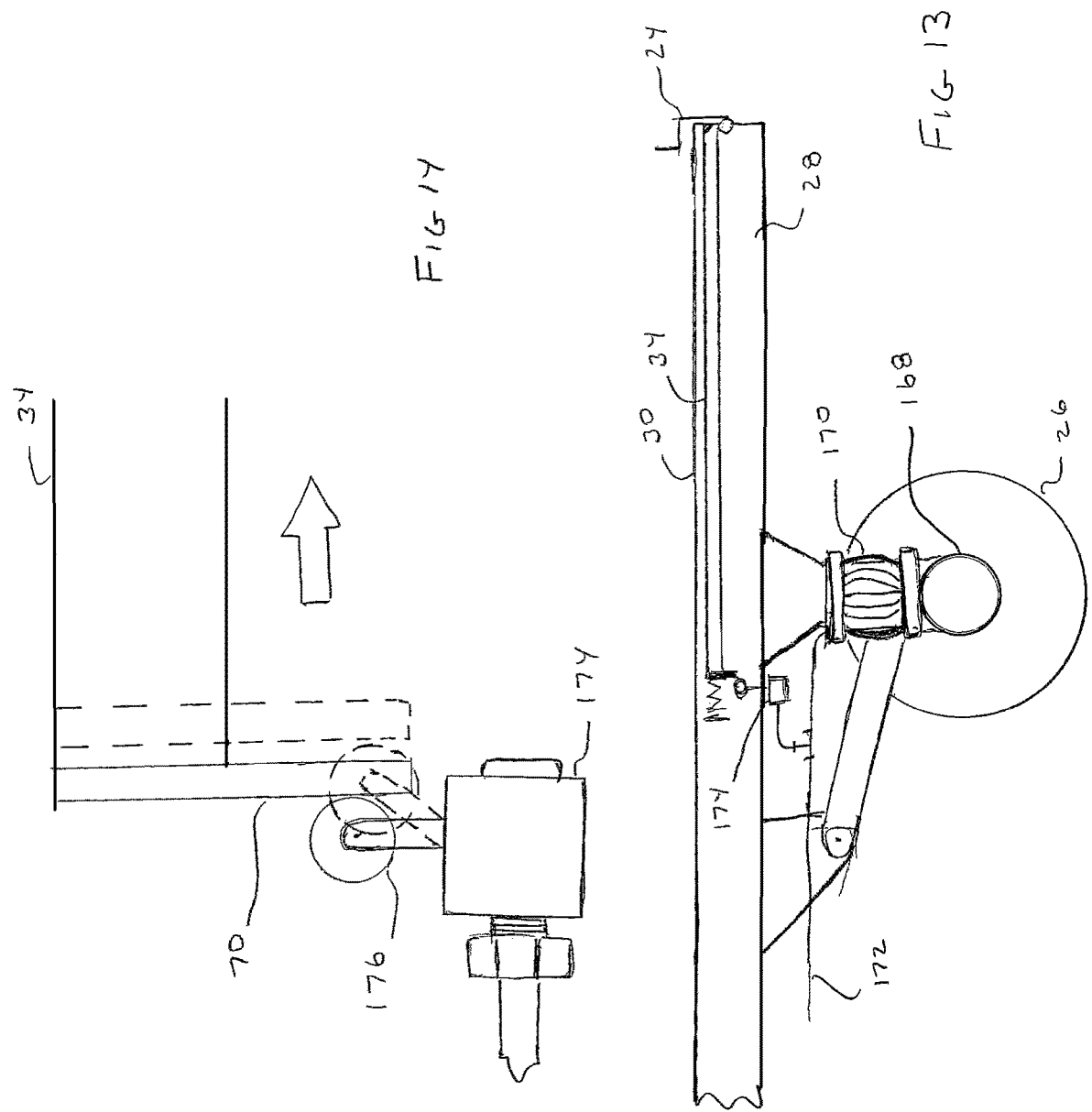

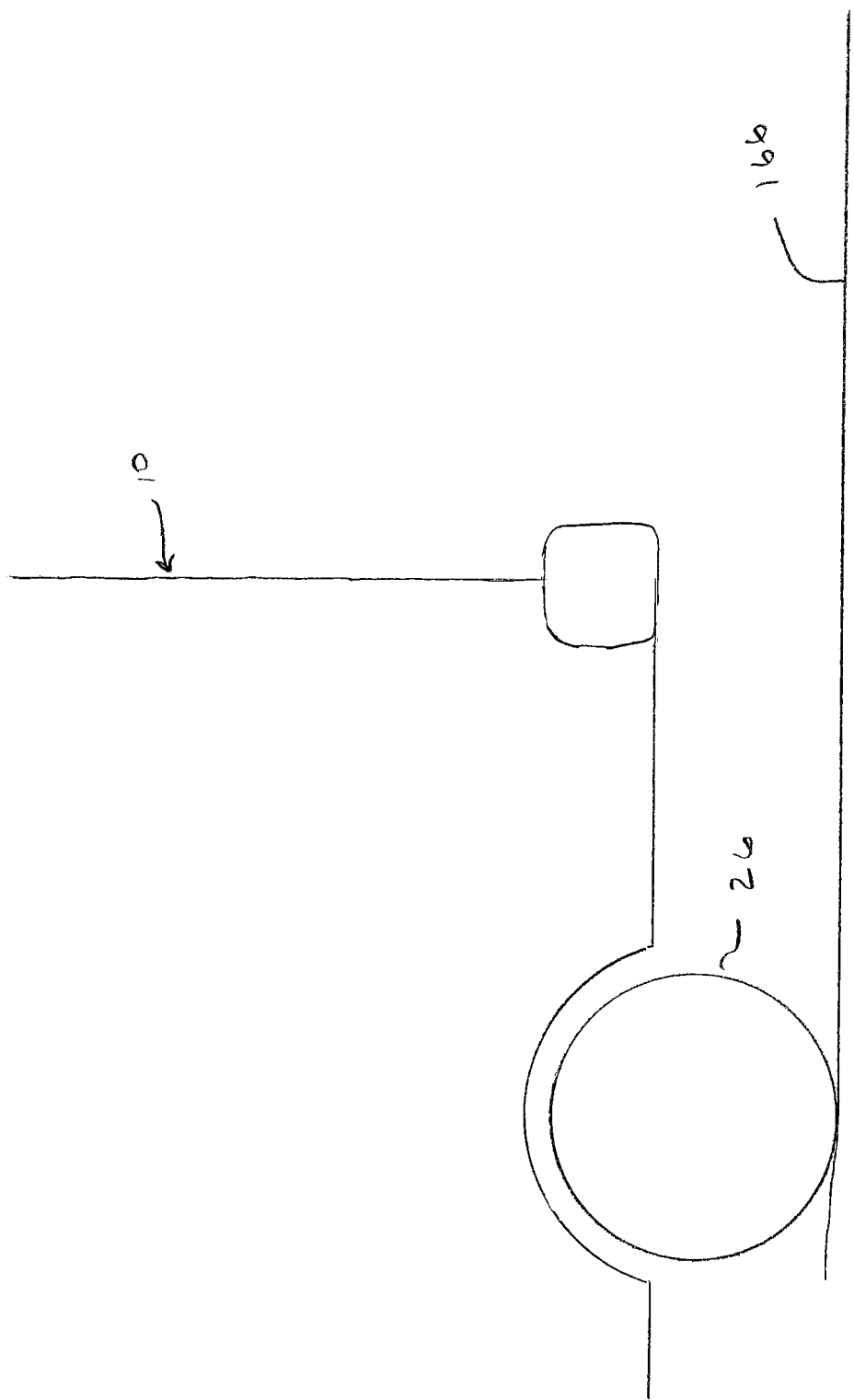

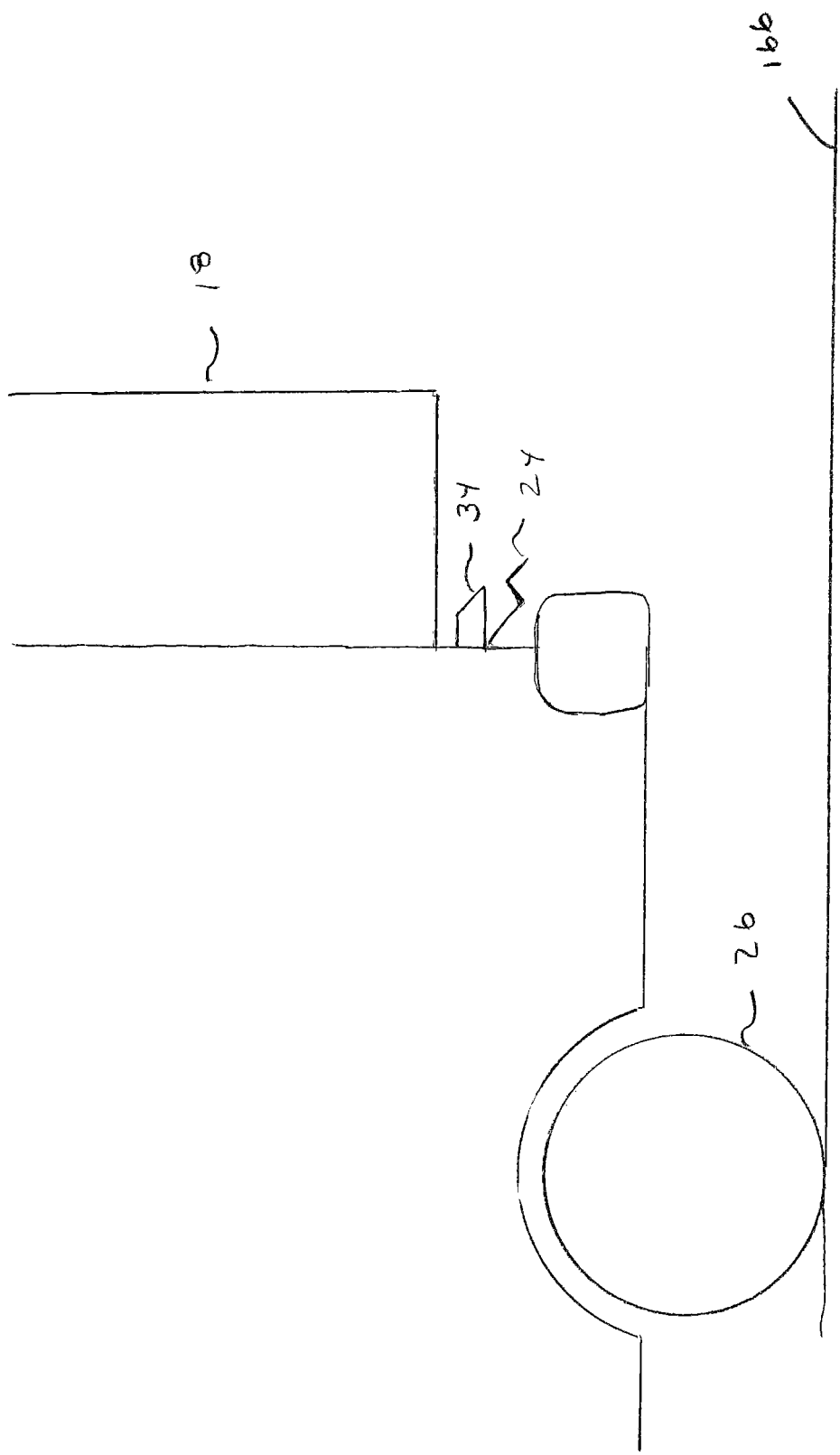

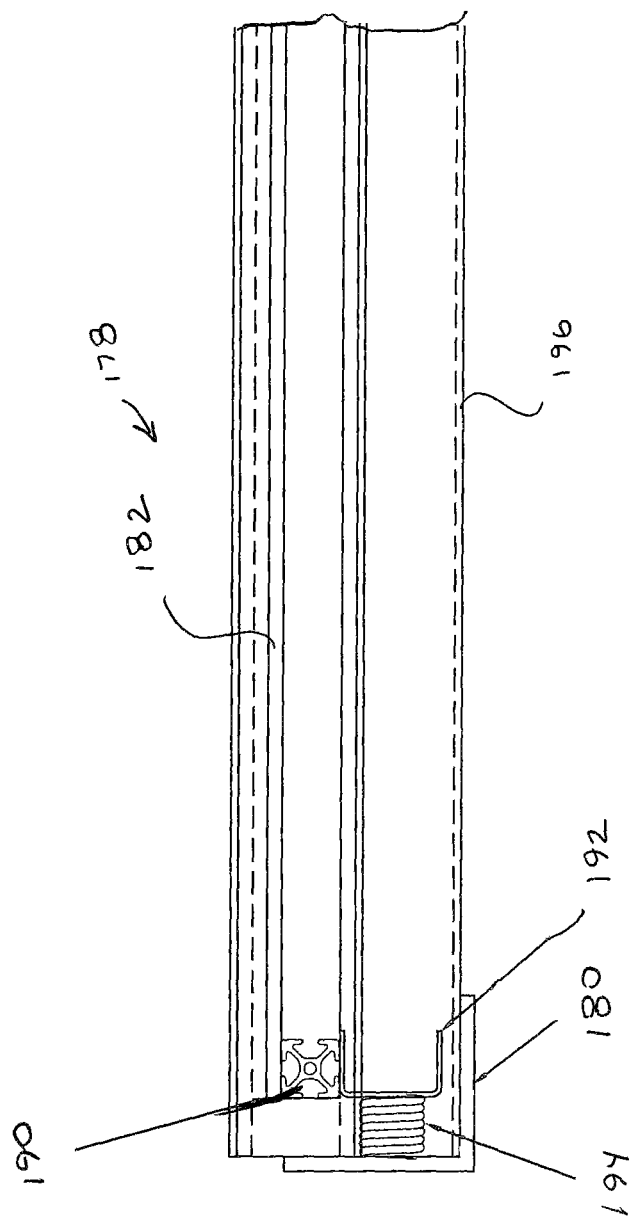

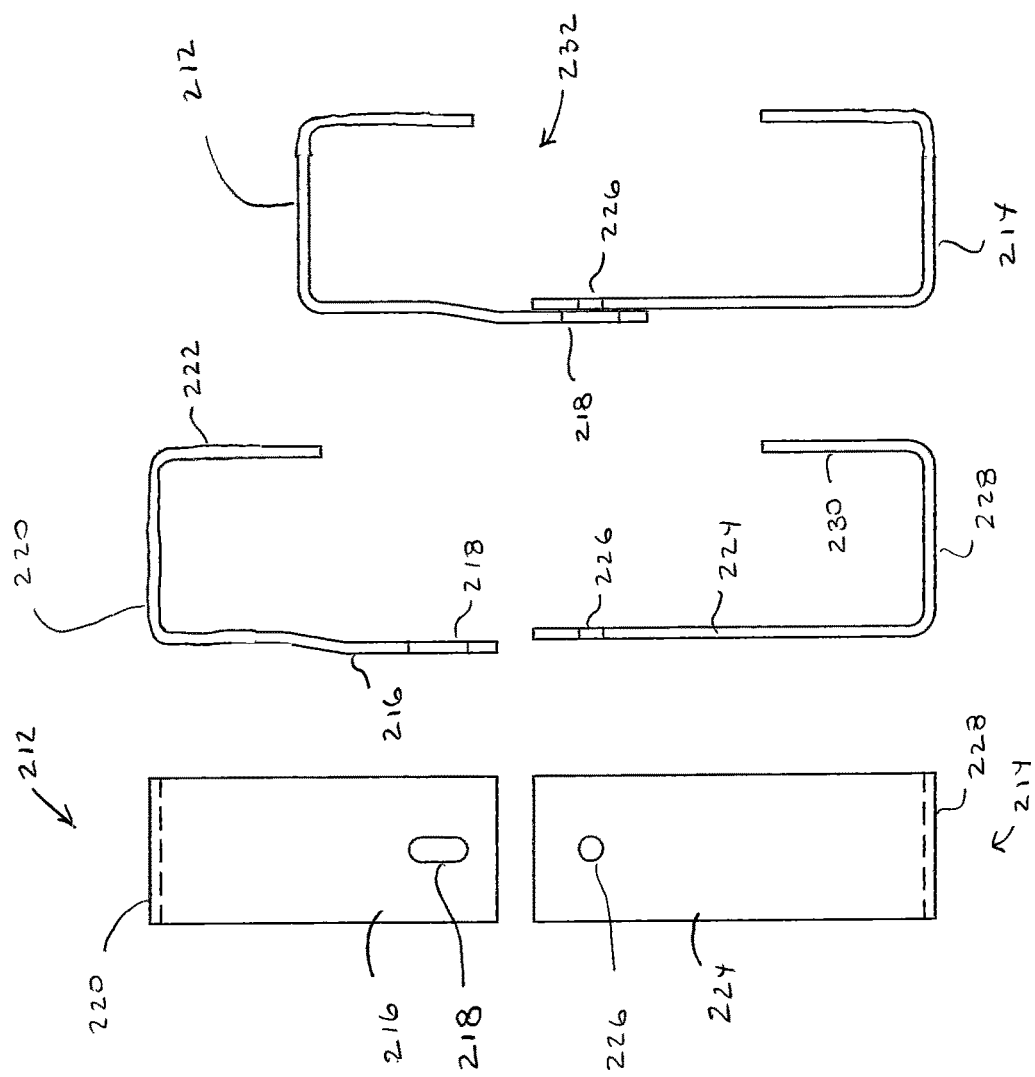

SCHOOL BUS EMERGENCY EGRESS SYSTEM

TECHNICAL FIELD

Exemplary arrangements relate to a system for providing emergency egress from a multi-passenger vehicle. Exemplary arrangements are particularly directed to an emergency egress system that can be used with a bus, such as a school bus.

BACKGROUND

Multi-passenger vehicles typically include one or more exits that are to be used by persons to leave the interior area of the vehicle only in emergencies. Such emergency exits remain closed by emergency exit doors at all other times during vehicle operations.

In the case of some multi-passenger vehicles such as school buses, when an emergency exit door is opened, the emergency exit opening may be a significant distance above the ground. To jump from such a distance to the ground may present a challenge for some small children or for disabled individuals.

Emergency egress systems from school buses and other multi-passenger vehicles may benefit from improvements.

SUMMARY OF DISCLOSURE

Exemplary arrangements relate to an apparatus that provides improved emergency egress for persons from an interior area of the school bus or other multi-passenger vehicle. Exemplary arrangements provide for an extendable ramp which becomes automatically accessible adjacent to an emergency exit opening when the emergency exit door is movable from a closed position to an open position. The exemplary ramp is extendable from a retracted position to an extended position in which the ramp extends from adjacent to the bottom of the emergency exit opening to the ground. Persons in the vehicle may leave the interior area through the emergency exit opening and travel down the ramp from the vehicle to the ground.

Further exemplary arrangements provide for the suspension of the school bus or other vehicle to be lowered automatically responsive to opening of the exit door. As a result the ramp in the extended position is at a lesser acute angle than it would be with the vehicle in the normal condition. The smaller angle of the ramp may make it easier for persons leaving the vehicle to travel down the ramp to the ground.

Exemplary arrangements provide numerous other beneficial features and capabilities as hereinafter discussed.

BRIEF DESCRIPTION OF DRAWINGS

FIG. 5 is an enlarged partial rear view of the emergency egress system shown in FIG. 4.

FIG. 6 is a front view of the emergency egress system shown with the housing door in the housing closed position.

FIG. 7 is a side view of the housing and ramp of the emergency egress system, with the ramp in a retracted position, the emergency exit door in a closed position, and the housing door in a housing closed position.

FIG. 8 is a side view similar to FIG. 7, but with the housing door in a housing open position and with the ramp in the extended position.

FIG. 9 is an enlarged view of the rear portion of the housing, housing door, ramp and emergency exit door in the positions shown in FIG. 7.

FIG. 10 is an enlarged view of the housing, housing door and ramp in the extended position as shown in FIG. 8, and with the stop attached to the ramp in engagement with the member that prevents the ramp from moving outward beyond the extended position.

FIG. 13 is a schematic view of the exemplary ramp in a retracted position and the suspension components of the exemplary bus.

FIG. 14 is a schematic view of an air valve including a movable air release arm that moves responsive to ramp movement from the retracted position toward the extended position.

FIG. 15 is a side view of the exemplary bus shown in a condition prior to opening the emergency exit door.

FIG. 16 is a view similar to FIG. 15 showing the emergency exit door open, the housing door having moved from the housing closed position to the housing open position, and the ramp having moved from the retracted position toward the extended position.

FIG. 24 is a horizontal cross-sectional side view of the front portion of the alternative ramp and housing.

FIG. 25 shows a back view of a top piece and bottom piece of an exemplary alternative frame attachment bracket.

FIG. 26 shows a side view of the top piece and bottom piece of the frame attachment bracket shown in FIG. 25.

FIG. 27 is a side view that shows the top piece and bottom piece of the frame attachment bracket in engaged relation.

DETAILED DESCRIPTION

Figure 1:
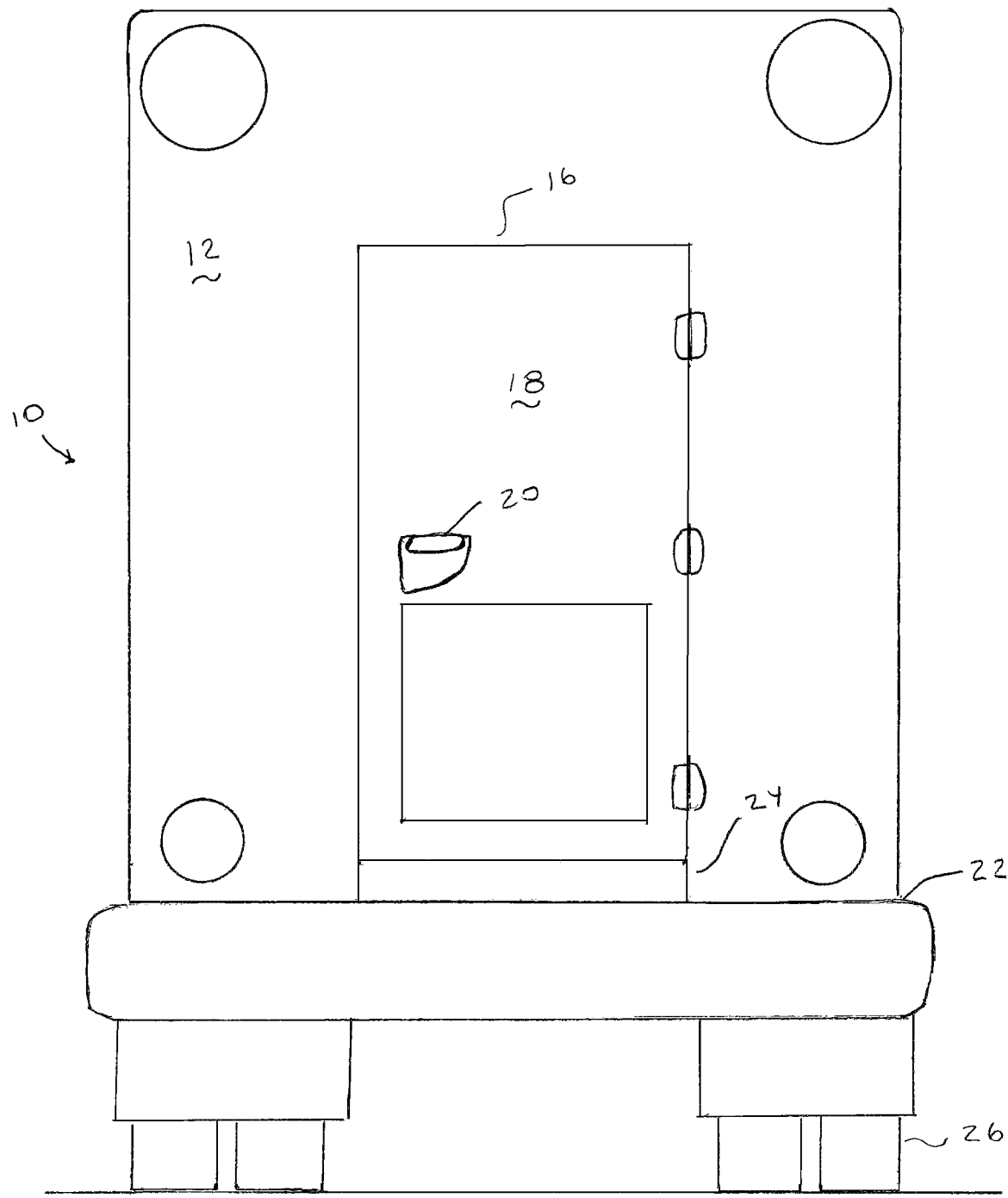
FIG. 1 is a rear view of an exemplary multi-passenger vehicle such as a school bus.

Referring now to the drawings and particularly to FIG. 1 there shown therein an exemplary multi-passenger vehicle 10 which incorporates the emergency egress system of an exemplary arrangement. The exemplary vehicle 10 shown is a school bus, however it should be understood that systems of the type described herein may be used in conjunction with other types of multi-passenger vehicles.

Figure 17:
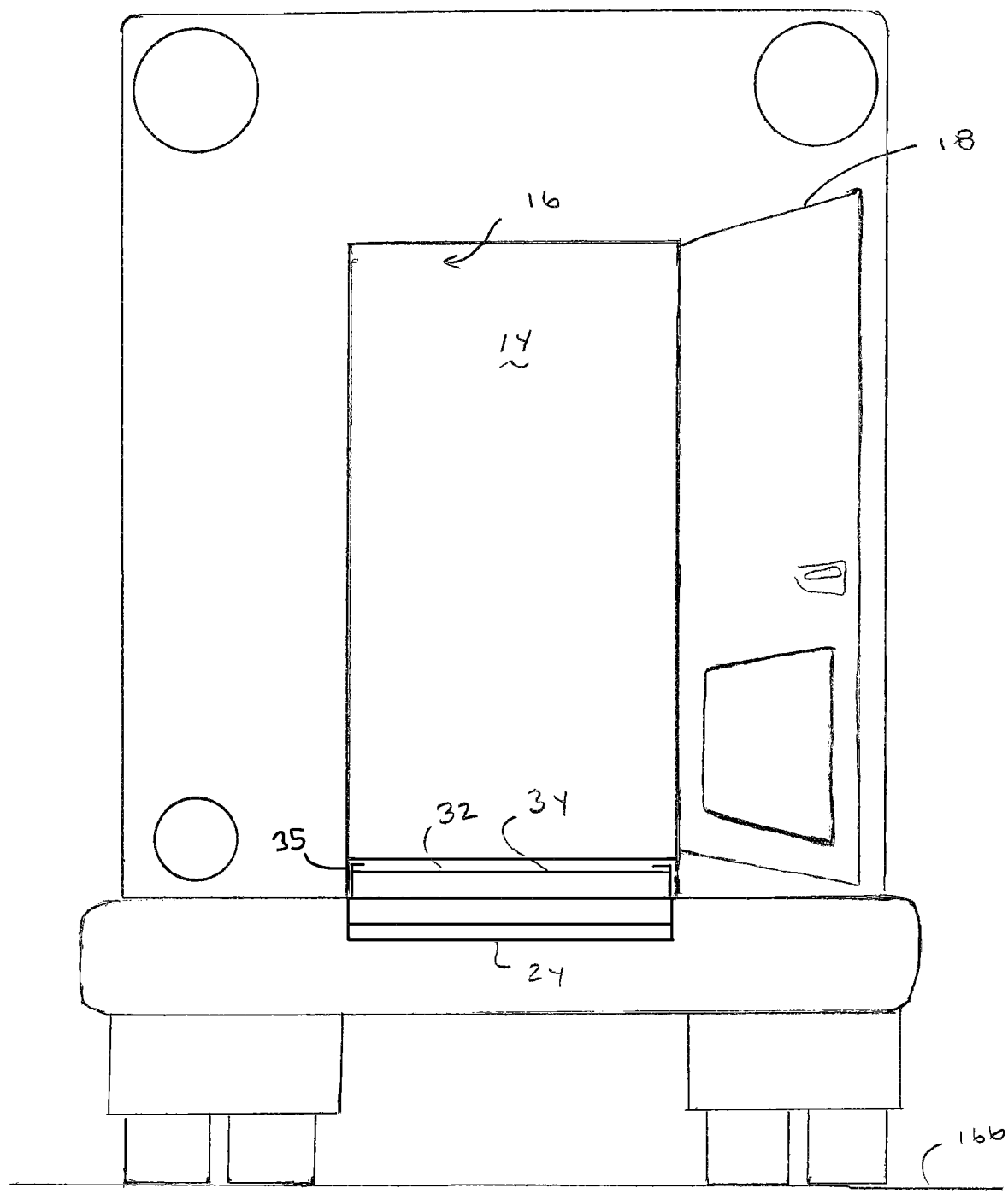
FIG. 17 is a rear view of the exemplary bus in the condition shown in FIG. 16.

In the exemplary arrangement the bus 10 includes a body 12 which bounds an interior area 14 (see FIG. 17) in which persons are housed during transport. The body includes an emergency exit opening 16. The emergency exit opening is normally closed during operation by an emergency exit door 18. The exemplary emergency exit door 18 includes interior and exterior handles 20 that can be manually engaged and moved such that the emergency exit door can be changed from a latched closed condition in which the door is latched and held in a closed position as shown in FIG. 1, and an openable condition in which the door is movable between the closed position to an open position as shown in FIG. 17. Of course it should be understood that the emergency exit door configuration is exemplary and in other arrangements other configurations may be used.

The exemplary bus includes a rear bumper 22. A housing door 24 later described in detail, extends above the rear bumper, and in the closed position shown in FIG. 1 the housing door 24 is in operative engagement with the emergency exit door 18. The bus 10 is movably supported by tires 26. The exemplary body 12 of the bus 10 is supported through a suspension system that is later discussed.

Figure 2:
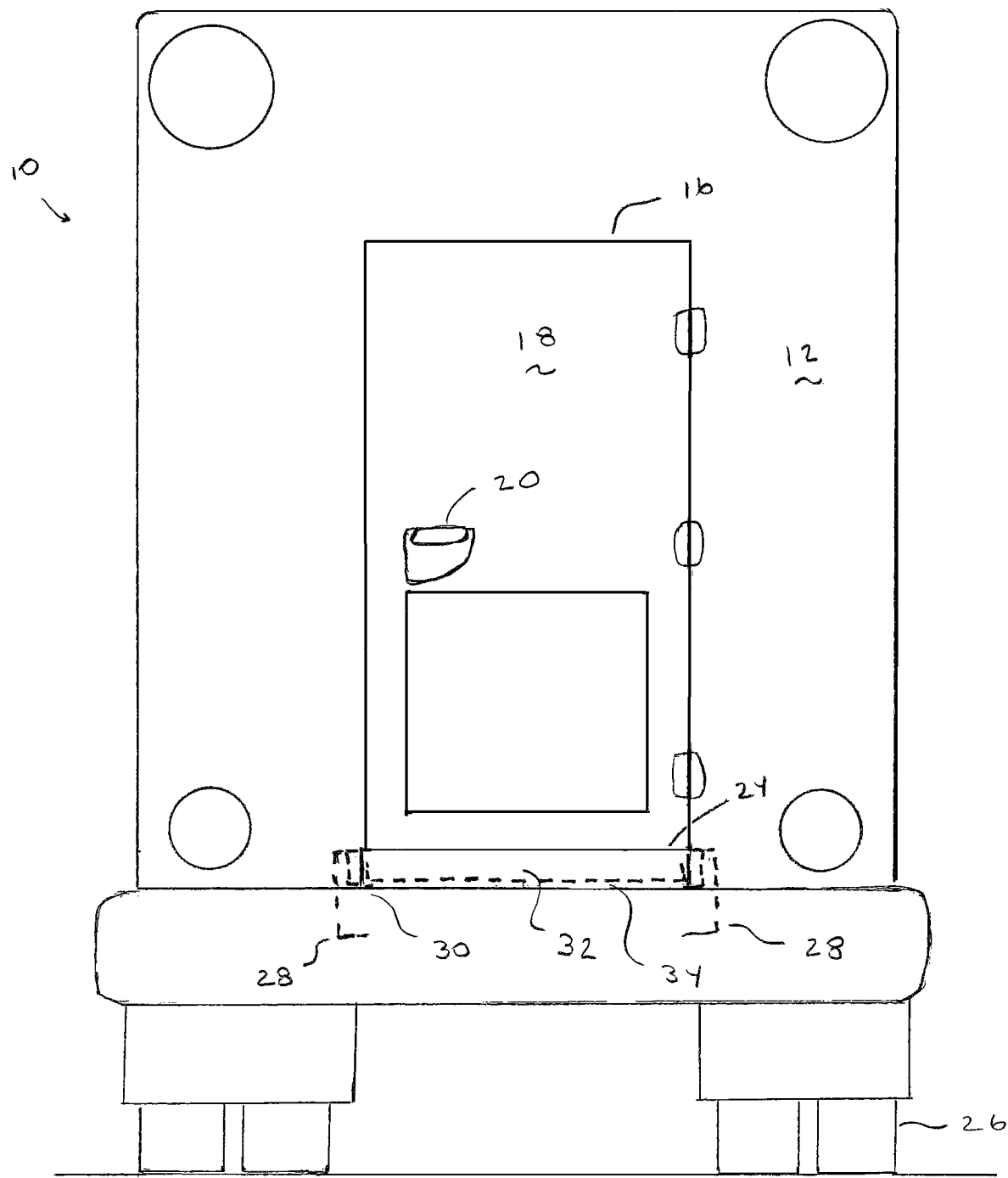
FIG. 2 is a view similar to FIG. 1, but with the vehicle frame rails and components of the exemplary emergency egress system shown in phantom.

As represented in FIG. 2 the exemplary bus body 12 is supported by a vehicle frame which includes a pair of longitudinally extending, horizontally disposed frame rails 28. A housing 30 of the exemplary emergency egress system is mounted in operatively fixed connection horizontally between the frame rails 28. The exemplary housing 30 bounds an opening 32 and houses a movable ramp 34 as later discussed in detail. In the exemplary arrangement the housing opening is positioned at a housing open end 33 and is in horizontal transverse alignment and is positioned vertically below the emergency exit opening 16. By being in transverse alignment with the emergency exit opening, the ramp 34 when in the extended position is vertically aligned with at least a substantial portion of the emergency exit opening so that persons leaving the interior area 14 through the emergency exit opening 16 can step outward onto the ramp 34 when the ramp is in the extended position.

The exemplary housing 30 includes a pair of horizontally disposed elongated side rails 36, 38. Each of the side rails is generally C-shaped in horizontal cross-section. The side rails 36, 38 of the housing 30 are mounted horizontally between and in fixed operatively supported connection with the frame rails 28 of the bus. Each exemplary side rail includes a horizontally inward extending lower lip 40 and a horizontally inward extending upper lip 42. A vertically extending web portion 44 extends in vertical cross section between the respective upper and lower lips of each of the exemplary side rails.

In the exemplary arrangement a pair of elongated support bars 46, 48 are in fixed operative connection with side rails 38 and 36 respectively. Each respective support bar is in fixed attached connection with a respective side rail through welding or other suitable attachment methods. A plurality of spacers 50 extend horizontally between an inner surface of each frame rail 28 and a horizontally outboard surface of respective support bar. In the exemplary arrangement fasteners 52 extend through holes in the spacers 50 and engage threaded openings in the adjacent support bar. This arrangement holds the housing 30 in fixed operatively supported connection between the frame rails 28 of the bus. Of course it should be understood that this mounting is exemplary and in other arrangements other mounting arrangements may be used.

In the exemplary arrangement in vertical cross section the upper lips 42, lower lips 40 and web portions 44 of the respective side rails define a channel cavity generally indicated 54. The channel cavity is generally rectangular in vertical cross-section and bounds an area in which the exemplary ramp 34 is constrained to move. The channel cavity of the exemplary arrangement is configured to require the ramp 34 to move generally horizontally and parallel to the frame rails 28 of the bus. This exemplary arrangement assures that the ramp 34 moves in the proper orientation from a retracted position in which the entire length of the ramp or at least a majority of the entire length of the ramp is positioned horizontally between the side rails, to an extended position in which the ramp extends outwardly from the open end of the housing and through the ramp opening in the body of the bus to the ground.

In the exemplary arrangement each of the upper lips 42, lower lips 40 and web portions 44 of each respective side rail include respective inner faces 56, 58 and 60. In the exemplary arrangement a low friction material overlies each of the inner faces 56, 58 and 60 to facilitate movement of the ramp 34 within the channel cavity 54. In the exemplary arrangement a high density low friction plastic insert 62 that is generally U-shaped in vertical cross-section is positioned in engagement with the inner faces of the respective side rail. In the exemplary arrangement the ramp 34 is in movably supported in operative connection with the lower lips 40 of the side rails 36, 38 through the low friction plastic insert 62. This facilitates movement of the ramp and reduces the force required to achieve movement of the ramp from the retracted position to the extended position. Of course it should be understood that this arrangement for reducing the force required to achieve ramp movement is exemplary and in other arrangements other approaches may be used. For example, in other arrangements rather than having a pair of disposed continuous channels, the channels may be comprised of discrete channel segments that are longitudinally disposed from one another along the length of housing area in which a ramp is housed. Alternatively in other arrangements, other channel configurations such as an L-shaped channel side rails or segments or I-shaped channel side rails or segments may be utilized.

As shown in FIG. 6 the exemplary housing 30 is bounded at the front end by a front member 64. The front member 64 extends horizontally between the side rails 36 and 38 and the support bars 46 and 48. In the exemplary arrangement the front member extends vertically downward below the bottom face of the ramp 34. The exemplary front member further engagingly supports at least one ramp deployment spring 66, which in the exemplary arrangement comprises at least one compression spring the function of which is later discussed. The at least one ramp deployment spring 66 is positioned to operatively engage a back surface 68 of a ramp stop 70 which is in fixed operative connection with the ramp 34. In other exemplary arrangements a deployment spring may not be used.

Further in the exemplary arrangement, a plurality of horizontally extending struts 72 are in operative connection with the housing 30. In the exemplary arrangement each strut 72 is in fixed operative connection with a horizontally disposed pair of spacers 50. The struts 72 serve to maintain the dimensional integrity of the housing 30, provide enhanced rigidity for the housing assembly and facilitate the positioning and mounting of the housing assembly between the frame rails 28 of the bus. Of course it should be understood that this reinforcement approach utilizing the struts 72 is exemplary and that other approaches may be used in other arrangements.

In one exemplary arrangement the ramp 34 is comprised of a generally flat longitudinally and horizontally extending base portion 74 and vertically extending side end portions 76. The vertically extending end portions are disposed at each horizontal side of the base portion of the ramp 34. The vertically extending end portions 76 are disposed horizontally inward of the web portions 44 of the side rails and inwardly of the vertically extending faces of the low friction plastic inserts 62. In the exemplary arrangement the vertically extending portions are positioned vertically above the horizontally inwardly extending lower lips 40 of the side rails and in movable connection above the inward extending face of each plastic insert that vertically overlies each inward extending lower lip.

Figure 12:
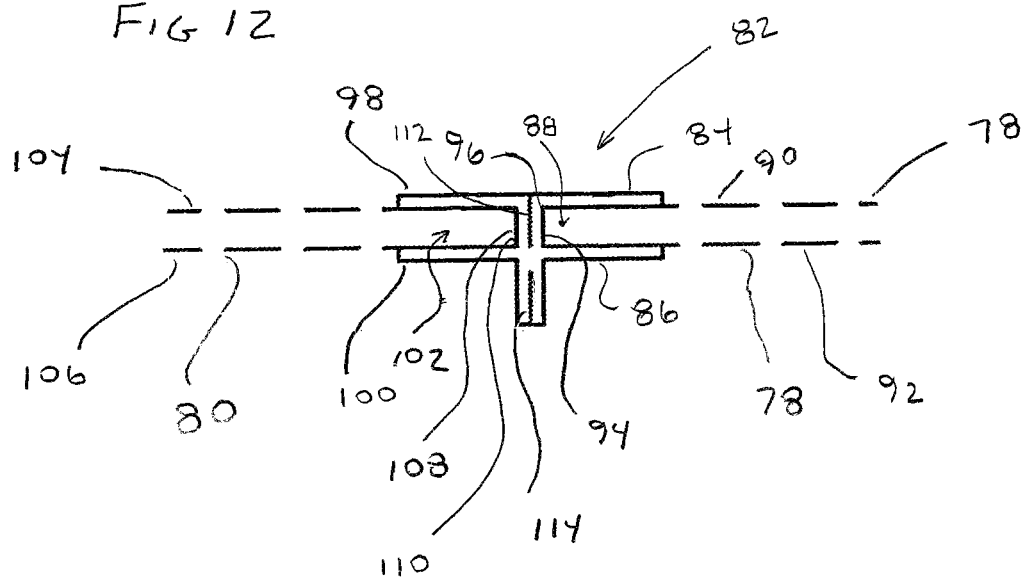
FIG. 12 is a vertical cross-sectional view of a base portion of the ramp.

In this exemplary arrangement the ramp 34 is comprised of a pair of adjacent horizontally extending elongated generally flat plates 78, 80. The flat plates 78, 80 are connected through a longitudinally elongated connector piece 82. The flat plates 78, 80 in fixed connection with the connector piece form the base portion 74 of the ramp. As shown in horizontal cross section in FIG. 12, the exemplary connector piece 82 includes a top flange 84 and a bottom flange 86. A recess 88 extends between the top and bottom flanges 84, 86. A top face 90 of flat plate 78 is in abutting engagement with the top flange 84 within the recess 88. A bottom face 92 of flat plate 78 is in abutting engagement with the bottom flange 86 within the recess 88. An inside face 94 of the flat plate 78 that extends between the top face 90 and the bottom face 92, is positioned in abutting engagement with an inside surface 96 that bounds recess 88.

The exemplary connector piece 82 further includes a top flange 98 and a bottom flange 100, which bound a recess 102. A top face 104 of flat plate 80 extends in the recess 102 and in abutting engagement with top flange 98. A bottom face 106 extends in the recess 102 and in abutting engagement with the bottom flange 100. An inside face 108 extends between the top face 104 and 106, and engages an inside surface 110 which bounds the recess.

In the exemplary arrangement the flat plates 78, 80 and the connector piece 82 are held in fixed engagement by welding or other fastening methods. This enables the ramp to be comprised of smaller horizontal plate sections to facilitate the construction thereof. It also provides the benefit that ramps of varied horizontal widths may be more readily constructed to suit the particular configuration of the vehicle on which the system is to be installed. The structure may also be comprised of different materials to provide desirable properties such as low weight, higher surface traction or corrosion resistance for example. Of course it should be understood that in other exemplary arrangements ramps comprising a single flat plate or more than two connected flat plates or other structures may be utilized. In some exemplary arrangements the top faces of the plates may be contoured or coated with a high friction material to avoid slipping by persons who travel on the ramp.

Further in the exemplary arrangement the connector piece 82 includes a pair of longitudinally extending projections 112, 114 at the forward end thereof. Projections 112 and 114 of the exemplary arrangement are utilized for purposes of positioning the at least one spring 66 which operates to move the ramp from the retracted position toward the extended position. In the exemplary arrangement projection 114 extends within an inside diameter of a helical coil spring 66. Projection 114 serves to engage and position the spring so that it is properly extending horizontally and along the direction of the base portion 74 of the ramp when the spring is compressed. The projection 112 extends outside the helical coil spring and in the exemplary arrangement further helps to hold the spring in the proper horizontal position while the spring is compressed. Of course this arrangement for helping to hold the one or more ramp deployment springs in proper position is exemplary, and in other arrangements other approaches may be used.

Figure 11:
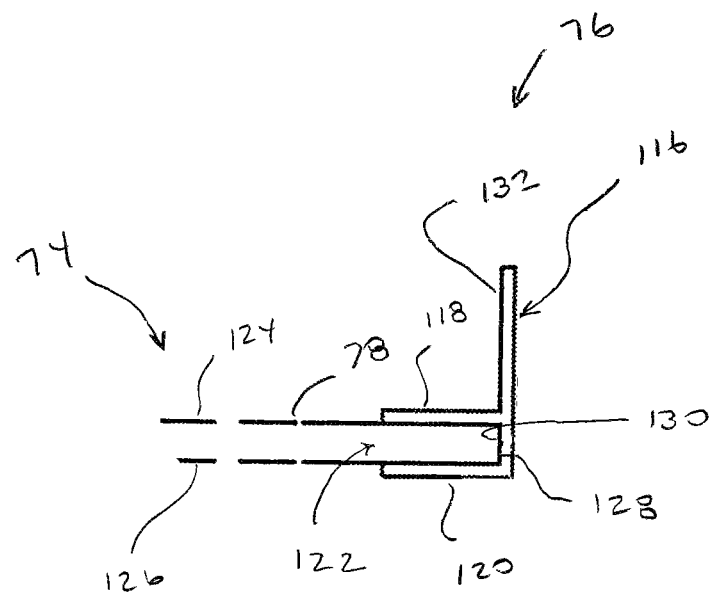
FIG. 11 is a vertical cross-sectional view of an end piece of the ramp.

In this exemplary arrangement the vertically extending end portions 76 of the ramp 34 each include end pieces 116 one of which is shown in vertical cross section in FIG. 11. It should be understood that while FIG. 11 shows an end piece that is positioned on the right side of the base portion 74 of the ramp when viewed from the rear of the vehicle, the end portion on the left side of the ramp will be the mirror image thereof.

The exemplary end piece 116 includes an upper flange 118 and a bottom flange 120 which bound a recess 122. The flat plate 74 extends in the recess 122. A horizontally extending top face 124 of the plate extends in abutting engagement with the upper flange 118. A horizontally extending bottom face 126 extends in abutting engagement with the bottom flange 120. A vertically extending lateral face 128 extends between the top face and the bottom face. The lateral face 128 extends in abutting engagement with an inside face 130 that internally bounds the recess.

The exemplary end piece 116 further includes a side flange 132 that extends vertically upward and perpendicular to the top face 124. The exemplary end piece 116 is held in fixed attached connection with the flat plate 78 through welding or other fastening methods. In the exemplary arrangement, the side flange 132 when the ramp is in the operative position, is disposed horizontally inward a small distance from the vertically extending inner face of the low friction plastic insert 62 to enable horizontal movement of the ramp. The bottom flange 120 is formed to be generally smooth so that it is generally freely movable in operatively supported slidable relation with the adjacent inward extending lower lip 40 of the adjacent side rail and the corresponding horizontally inward extending surface of the plastic insert 62 that overlies the lower lip 40. Of course it should be understood that in other exemplary arrangements the bottom flange 120 may be coated with a low friction plastic or other material to facilitate movement of the ramp within the housing. In still other exemplary arrangements other structures and configurations may be utilized including rollers, bearings or other structures suitable for reducing resistance to movement of the ramp relative to the adjacent housing structures.

In other exemplary arrangements the ramp may be comprised of a single unitary structure. For example in some arrangements the ramp may be comprised of a generally planar piece of material with lateral side walls that extend vertically but are not as vertically elongated as in the previous arrangement, which side walls serve the functions of the end pieces previously described. In some exemplary arrangements such ramps may be comprised of metals such as aluminum or steel, or suitable metal alloys. In other exemplary arrangements the ramp may be comprised of a molded plastic material or reinforced plastic material or assemblies of components comprised of such materials. In further alternative arrangements ramps may be comprised of one or more components comprised of high-strength carbon fiber. In some arrangements ramps comprised of molded material may include integral surface features such as ribs, recesses, contours or surface roughness to provide enhanced frictional engagement to prevent slippage by persons who travel down the ramp. In other exemplary arrangements surface treatments may be applied to the ramps to achieve enhanced friction properties. Of course it should be understood that these approaches are exemplary in other arrangements other approaches to be used.

Figure 3:
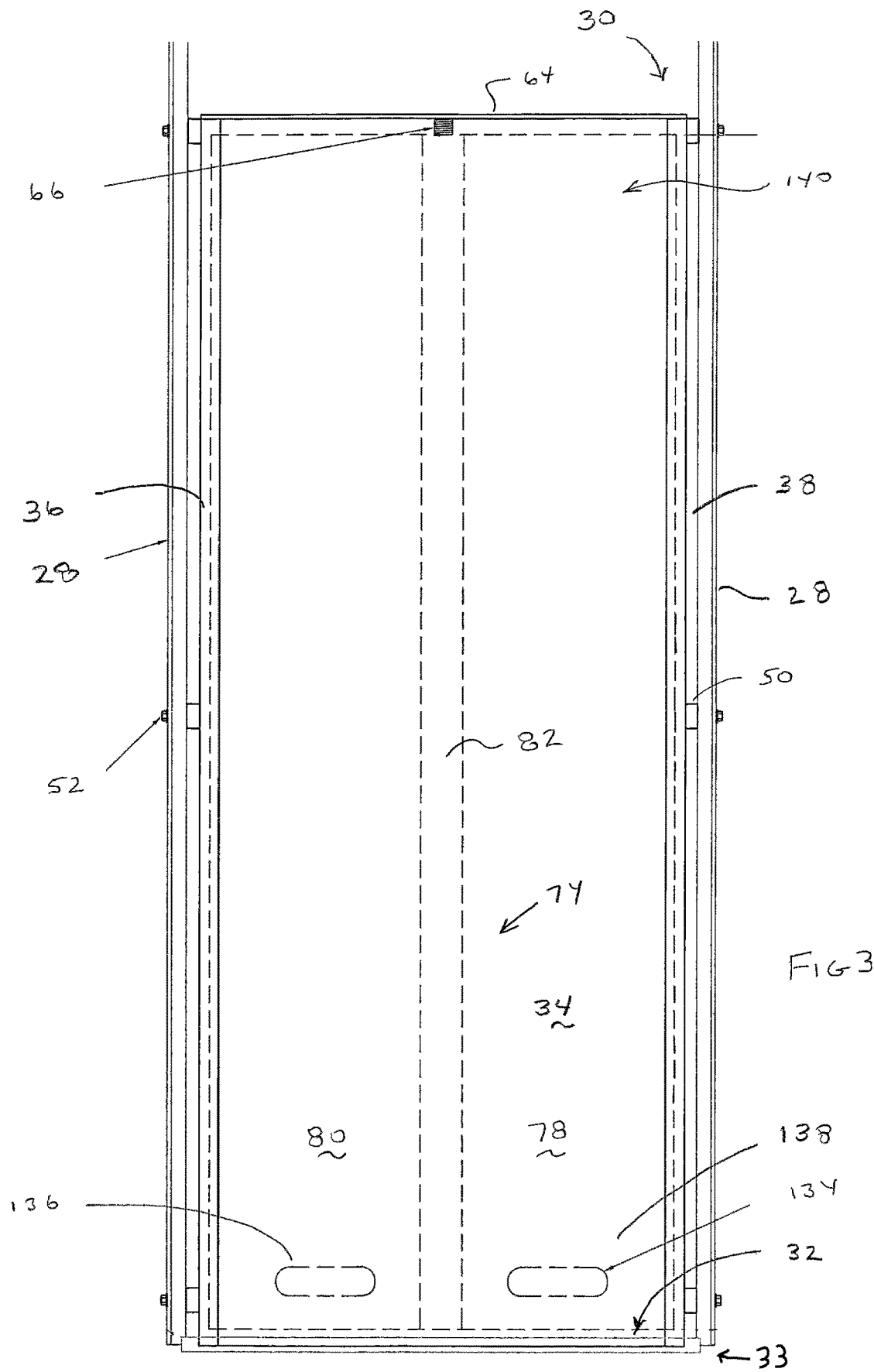
FIG. 3 is a top view of the housing of the exemplary emergency egress system positioned between the frame rails of the bus, and with the ramp of the exemplary system shown in phantom.

As shown in FIG. 3, the exemplary ramp 34 includes manually engageable handles 134, 136. In the exemplary arrangement the manually engageable handles are comprised of openings through the flat plates 78, 80 which comprise the base portion 74 of the exemplary ramp 34. In the exemplary arrangement that handles extend through the base portion of the ramp 34 in a ramp outer end 138. The ramp outer end 138 includes the portion of the ramp closest to the ramp housing opening 32 and the ramp opening in the body of the bus when the ramp is in the retracted position as shown in FIG. 3, for example. In exemplary arrangements the ramp handles are accessible through the ramp opening when the ramp is in the retracted position and/or is moved outward somewhat by a spring or other mechanism. The ramp outer end is disposed from a ramp inner end 140. The exemplary ramp inner end is opposed of the ramp outer end, and is operatively connected with the ramp stop 70. Of course it should be understood that the configuration of the manually engageable handles 134, 136 that may be utilized to move the ramp between the retracted position and the extended position are exemplary. In other arrangements other types of handles may be used.

Figure 4:
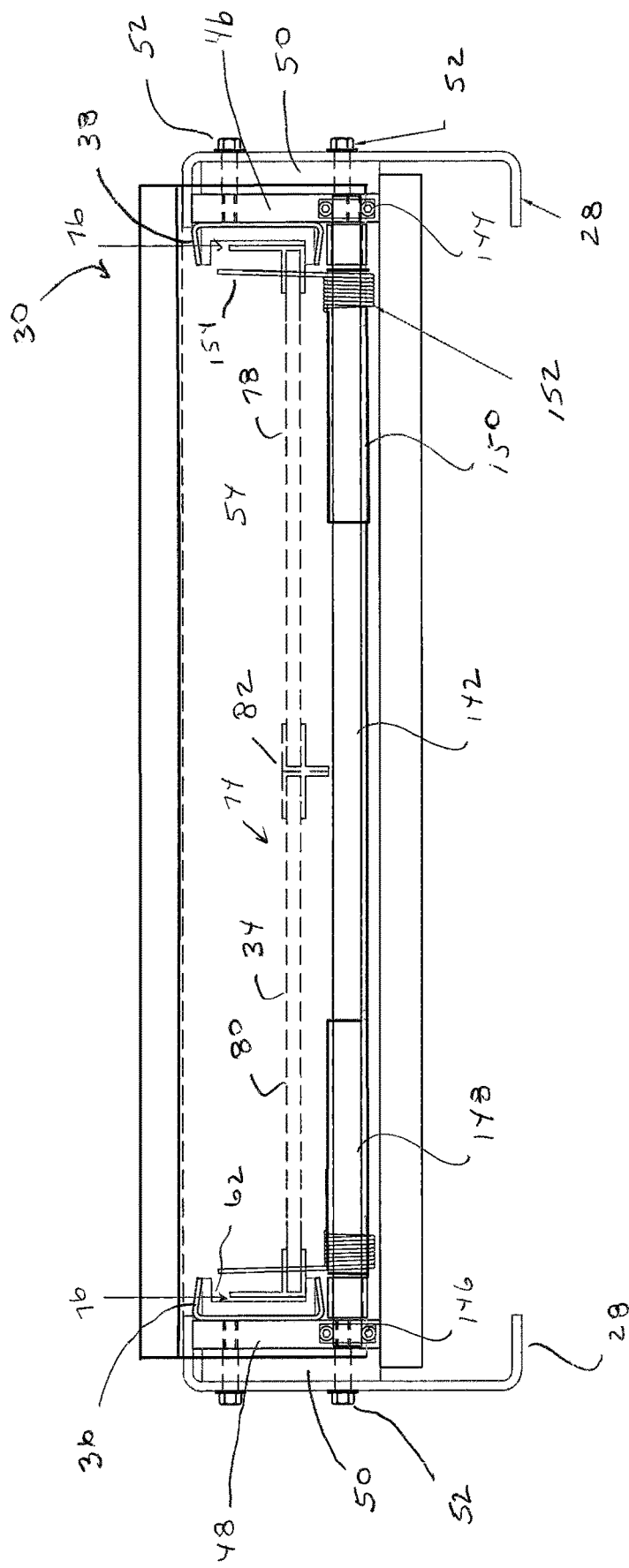
FIG. 4 is a rear view of the frame rails of the bus and the housing of the emergency egress system, with a housing door thereof in a housing closed position.

In the exemplary arrangement the housing door 24 is rotationally movably mounted relative to the housing 30. As shown in FIG. 4, a member which comprises a shaft 142 extends horizontally across the housing in a position that is disposed below the housing opening 32. The shaft 142 is mounted in operatively supported connection with the support bars 46 and 48 through brackets 144 and 146 respectively. The housing door 24 is rotatably movably mounted in operatively supported connection with the shaft through a pair of transversely disposed sleeves 148, 150 each of which extends about the shaft. The sleeves enable the housing door 24 to move in supported connection with the shaft between the housing closed position as shown in FIG. 9, in which the housing door closes the ramp opening in the body of the bus and housing opening 32, and the housing open position in which at least a portion of the housing door 24 is disposed away from the housing and ramp openings as shown in FIG. 10.

In the exemplary arrangement a pair of horizontally disposed torsion springs 152 are operative to bias housing door 24 which serves as a ramp access door, toward the housing open position. In the exemplary arrangement each of the torsion springs 152 extend in surrounding relation of a respective sleeve 148, 150 and each include a spring arm 154 which operatively engages the door to bias the door towards the housing open position. Of course it should be understood that this arrangement is exemplary and in other arrangements other approaches may be used.

The exemplary housing door 24 is configured to be in operative connection with the emergency exit door 18. The housing door 24 includes in cross section an extension 156 that in the closed position of the ramp access door extends upward from the shaft 142 as shown in FIG. 9 for example. The exemplary extension includes a horizontally extending portion 158. In the housing closed position of the housing door 24, the horizontally extending portion 158 extends in the emergency exit opening 16 and underneath the emergency exit door 18. The exemplary housing door extension 156 further includes a vertically extending portion 160. The vertically extending portion 160 is configured to engage a surface of the door such as an inside face 162 of the emergency exit door 18 when the emergency exit door in the closed position.

As represented in FIG. 9 in the exemplary arrangement when the emergency exit door is in the closed position, the vertically extending portion 160 of the extension of the housing door 24 is engaged with the inside face 162 of the door, which is operative to hold the housing door 24 in the housing closed position. In this condition an inner surface of the housing door 24 operatively engages the leading face 164 of the ramp outer end 138. In this position the housing door holds the exemplary ramp 34 in the retracted position within the housing against the biasing force of the at least one spring 66.

Figure 18:
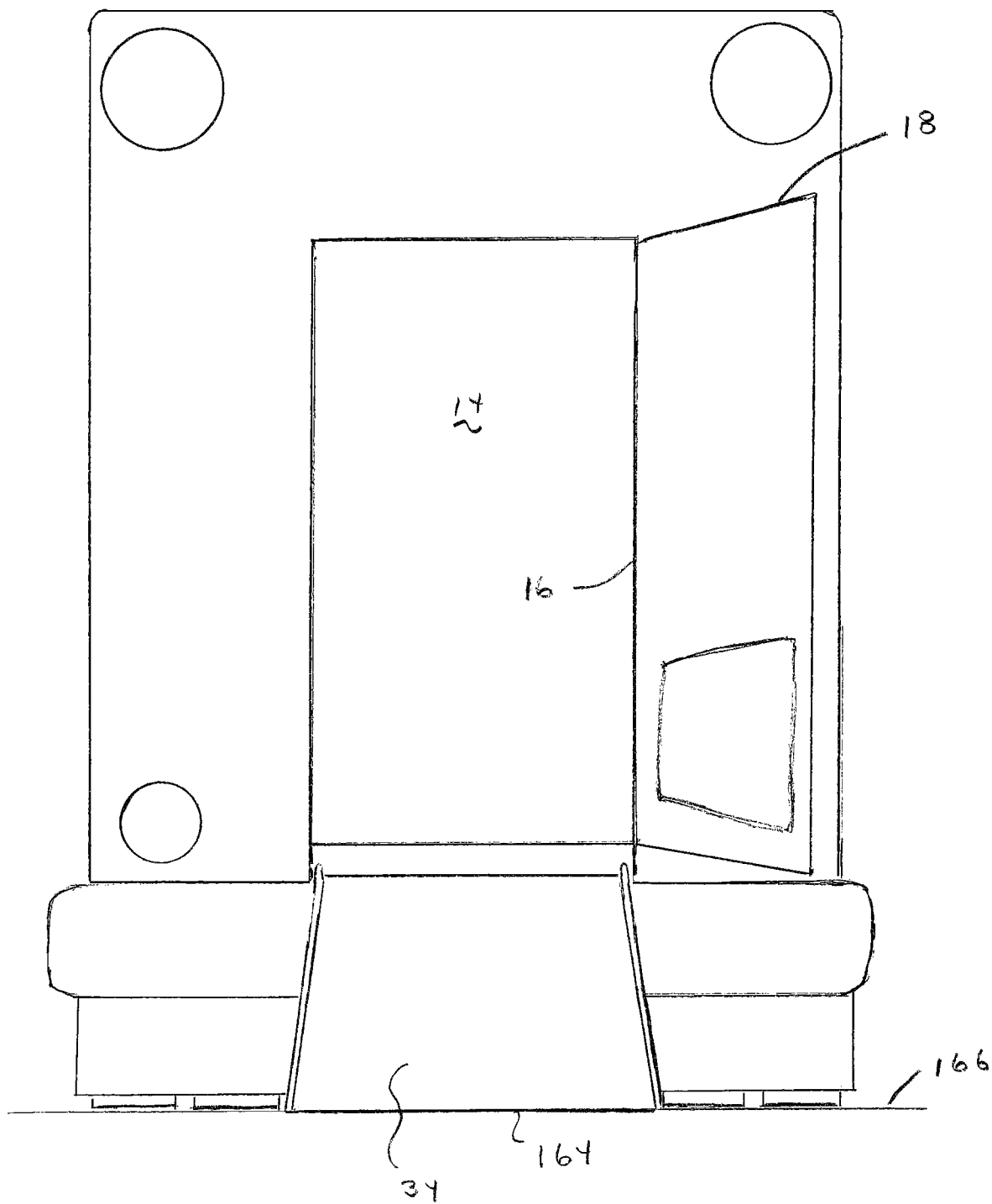
FIG. 18 is a rear view of the exemplary bus similar to FIG. 17, but with the suspension lowered responsive to opening of the emergency exit door, and with the ramp in the extended position to the ground.

In an exemplary arrangement when the emergency exit door 18 is in the openable condition and is moved to the open position, the inside surface 162 of the door no longer holds the vertically extending portion 160 in the emergency exit opening. As a result the housing door 24 moves from the housing closed position shown in FIG. 9 to the housing open position as shown in FIGS. 8, 10, 16 and 17. The ramp access door in the door open position opens the ramp opening 35 in the body of the bus and exposes the ramp through the open end 33 of the housing. In the exemplary arrangement when the housing door 24 initially moves to the housing open position, the at least one spring 66 is operative to move the ramp 34 from the retracted position within the housing 30, toward the extended position in which the ramp extends from the housing to the ground 166. In the exemplary arrangement the spring 66 is operative to move the ramp 34 a relatively small distance outward from the opening 32 and the ramp opening, toward the extended position as shown in FIG. 16. In this exemplary arrangement the ramp 34 extends outward from the opening 32 a sufficient distance so that the ramp can be manually engaged either by the handles 134, 136 and/or by the leading face 164 of the ramp to enable the ramp to be pulled outwardly to the ramp extended position in which the leading face of the ramp 164 reaches the ground 166 as shown in FIG. 18.

In the configuration of the exemplary arrangement, the at least one spring 66 which biases the ramp 34 outward an initial relatively small distance, enables the ramp to be more manually accessible so it can be moved further outwardly toward the extended position. This arrangement enables persons who wish to immediately jump from the interior area 14 of the bus to the ground 166 without taking the time to extend the ramp 34, may do so. However it should be understood that in other exemplary arrangements, further springs, motors or other devices may be in operative connection with the ramp to cause the ramp to move to the extended position so that the ramp extends to the ground automatically a very short time after the emergency exit door opens. In still other exemplary arrangements suitable circuitry or other mechanisms may be provided so that the ramp can be automatically moved from the retracted position or from an initial small amount outwardly from the retracted position, to the fully extended position, responsive to one or more user inputs, such as pressing a button that is accessible adjacent to the emergency exit opening 16. Of course these approaches are exemplary and in other arrangements different or alternative approaches to deploying and extending the ramp or other egress structure may be used.

In other exemplary arrangements other structures may be utilized for purposes of enabling the housing door to move from a housing closed position closing the ramp opening and/or the opening of the housing, to the housing open position in which at least a portion of the housing door is disposed from the housing opening so as to enable the ramp to be externally accessible so that the ramp may extend therefrom. For example in some arrangements a latch may be operatively engaged with the housing door such that when the emergency exit door is changed to an openable condition, the latch releases the housing door to be movable to the housing open position. In some exemplary arrangements the latch or other structure which operates to hold the housing door in a housing closed position may be operatively engaged with a latch or other structure that holds the emergency exit door in the closed position, such that when the latch which holds the emergency exit door is released so that the door is in an openable condition, the housing door moves or becomes movable so as to open the housing opening.

In other alternative arrangements the housing door may be in operative supporting connection with the back end of the ramp. In such arrangements when the ramp is retracted within the housing the housing door operates to close the housing opening and/or the ramp opening. In such arrangements the ramp may be operatively engaged with a latch or other suitable structure that holds the ramp retracted within the housing. In some alternative arrangements the opening of the emergency exit door may be operative to cause the ramp to move toward the extended position responsive to a spring or other similar biasing member. In other exemplary arrangements, the ramp may be held by a latch, catch or other holding structure when the emergency exit door is in the latched and closed condition. Actuation of the structure which operates to hold the emergency exit door closed so that the door becomes in the openable condition, causes the latch, catch or other structure holding the ramp in the retracted position to be released such that the ramp moves from the retracted position toward the extended position. In different arrangements the latch or other structure that holds the ramp and/or the housing door may be operatively connected to the emergency exit door, latching structure for the emergency exit door, or other structure through mechanical connections, electrical connections or a combination thereof. Numerous different arrangements may be provided to enable the opening of the housing structure responsive to the emergency exit door being in the openable condition and/or opening, so as to enable the exemplary egress system to be deployed.

In the exemplary arrangement once the ramp is in the position shown in FIG. 16, the ramp 34 may be moved outwardly toward the extended position until the downward extending stop 70 engages the shaft 142 as represented in FIG. 10 and FIG. 8. In the exemplary arrangement the stop 70 engages the shaft 142 in the area between the sleeves 148, 150. As a result the shaft 142 serves as a member that engages the stop 70 and prevents further movement outward from the opening 32 toward the extended position once the ramp 34 is in the extended position as shown in FIG. 18. In the exemplary arrangement the ramp 34 is enabled to be rotatably movable with the stop 70 abuttingly engaged with the shaft 142 so as to enable the ramp 34 to extend an acute angle from the housing 30 to the ground 166. Further the exemplary configuration of the width of the stop 70 widely distributes any impact forces or loading forces applied to the ramp 34 as a result of the rapid deployment of the ramp and the weight of persons moving down the ramp to the ground so that the structural integrity of the components of the emergency egress system are maintained.

In addition the exemplary system enables the ramp to be returned from the extended position to the retracted position, and the housing door 24 and the emergency exit door 18 each returned to its respective closed position after the emergency is over. This enables the exemplary system to return the bus to its normal operating condition without significant delay, and the system to be reliably deployed again in the event of another emergency.

In an exemplary arrangement the suspension of the bus is interconnected with the emergency egress system. The exemplary arrangement provides automatically placing the emergency exit opening 16 closer to the ground 166 responsive at least in part to the opening of the emergency exit door 18. In an exemplary arrangement as schematically represented in FIG. 13, the bus includes an axle 168 which is supported above ground by the tires 26. The suspension of the bus includes at least one pneumatic spring 170. The pneumatic spring extends vertically between the axle and the frame rails and is supplied with air pressure through an air line 172 which maintains the pneumatic spring 170 properly pressurized and expanded to maintain the normal vehicle suspension height.

In the exemplary arrangement the air line 172 is fluidly connected to an air valve 174. The exemplary air valve 174 is changeable between open and closed conditions responsive to the position of an air release arm 176. In exemplary arrangements the release arm may comprise a movable lever, movable button, movable plunger, movable slide or other movable member, or a combination thereof. In the exemplary arrangement the air release arm is in operative connection with the ramp 34. The exemplary air release arm as shown schematically in FIG. 14, is in operative connection with the ramp through the ramp stop 70. The ramp stop is operative to maintain the air release arm 176 in a first position when the ramp 34 is in the retracted position in the housing. In the exemplary arrangement when the air release arm is in the first position as shown in solid lines in FIG. 14, the air valve 174 is in the closed condition.

When the ramp 34 is moved responsive to the at least one spring 66 or otherwise toward the extended position as represented by the arrow in FIG. 14, the stop 70 moves to the position shown in phantom. This causes the air release arm 176 to move to a second position shown in phantom. The movement of the air release arm causes the air valve to change from the closed condition to the open condition. When the air valve is in the open condition, air in the pneumatic springs 170 is exhausted to atmosphere through the air valve at a rapid rate. This causes lowering of the suspension so that the emergency exit opening becomes lower and closer to the ground 166. As a result, when the ramp is moved to the extended position, the ramp extends at a smaller acute angle relative to the ground than would be the case if the bus suspension were not lowered. Further even if the ramp is not moved to the fully extended position, the movement of the emergency exit opening closer to the ground makes it easier for persons to exit from the interior area of the bus through the emergency exit opening 16. Of course it should be understood that these approaches are exemplary, and that in other arrangements other approaches may be used.

For example, in other exemplary arrangements the air valve may be actuated mechanically through operative connection with other components of the bus or the emergency egress system. For example in some arrangements changing a condition of a latch associated with the emergency exit door to an openable condition may be operative to cause the air valve to release the air in the suspension of the bus. Alternatively opening of the emergency exit door may cause movement of a lever or similar structure that is operative to cause the valve to change conditions. Alternatively in other arrangements an electrically actuated valve may be utilized. The electrically actuated valve may be operative responsive to receiving an electrical signal from a switch or one or more switches or circuit elements (or the loss of a signal from a switch or other circuit elements) to cause the air pressure to be released. Alternatively or in addition, the electrical circuitry may also be operative to cause a release of air pressure from the suspension responsive to circuitry such as an accelerometer which is operative to automatically determine that the bus or other vehicle has been involved in a collision or other impact, so as to cause the release of air pressure and facilitate egress from the emergency exit. Of course these approaches are exemplary of numerous different approaches that may be used.

FIGS. 15 through 19 demonstrate the operation of the previously described exemplary emergency egress system in connection with the exemplary school bus or other multi-passenger vehicle. FIG. 15 is a side view corresponding to FIG. 1 which shows the bus 10 in a normal operating position prior to the opening of the emergency exit door 18.

In an emergency one of the emergency exit door handles 20, either on the interior or the exterior of the emergency exit door, is moved to unlatch a latch or other engaging structure in operative connection with the door so it is in the openable condition and is no longer held in the closed position. When the emergency exit door 18 is moved from the closed position to the open position as shown in FIGS. 16 and 17, the housing door 24 which serves as a ramp access door moves responsive to the force of the torsion springs from the housing closed position to the housing open position. In the open position the ramp is movable out of the open end of the housing and through the ramp opening in the body of the bus. The exemplary ramp 34 moves from the retracted position toward the extended position a sufficient distance to enable the ramp to be more readily manually engaged.

Figure 19:
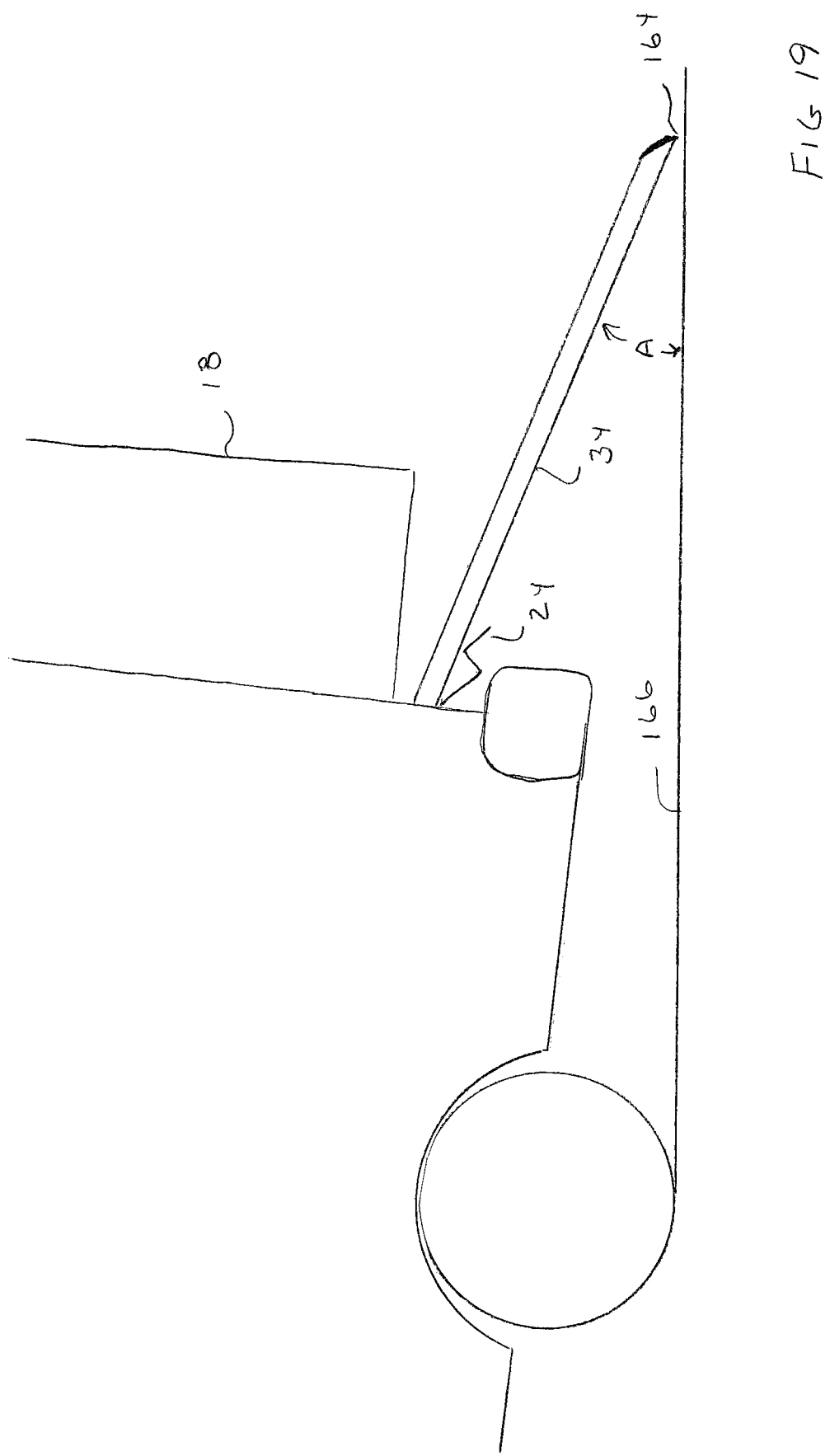
FIG. 19 is a side view of the exemplary bus corresponding to the condition of the emergency egress system as shown in FIG. 18.
Figure 20:
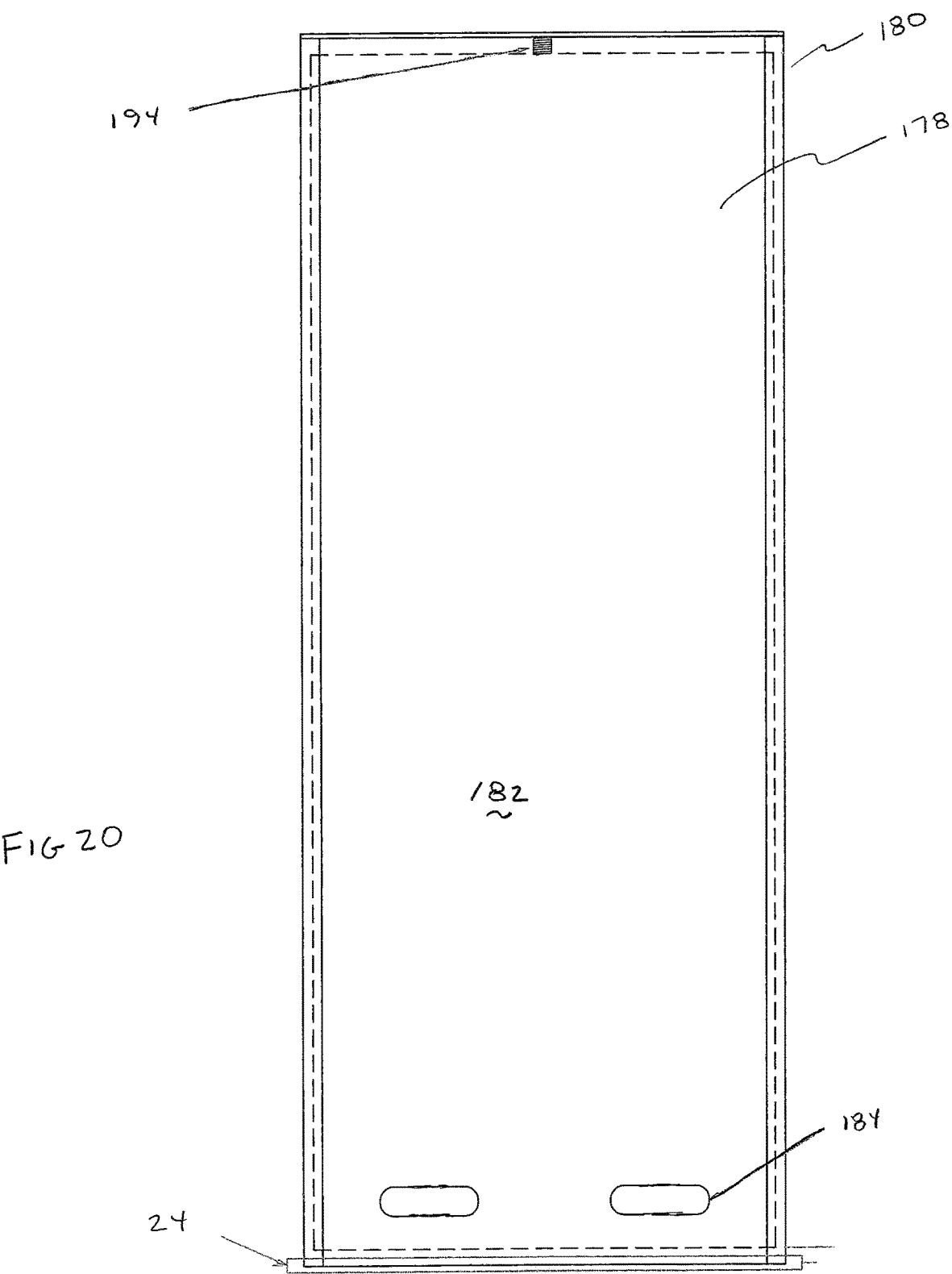
FIG. 20 is a top view of an alternative housing and alternative ramp of an exemplary arrangement.

In the exemplary arrangement a very short time after the emergency exit door 18 has been opened, the air is exhausted from the pneumatic springs lowering the suspension of the bus. This causes the emergency exit opening 16 to move closer to the ground 166 as shown in FIGS. 18 and 19. In this condition the ramp can be moved to the extended position in which the leading end 164 of the ramp 34 is in contact with the ground. The lowering of the bus suspension causes the ramp 34 to extend at a smaller acute angle (A) relative to the ground 166 than the ramp would extend if the suspension were not lowered. This makes it easier for persons to travel from the interior area 14 of the bus downward on the ramp 34 to reach the ground 166. In some exemplary arrangements this may facilitate the ability of persons who may have difficulty walking or who may be in wheelchairs the more easily leave the bus interior area 14 through the exit opening 16 so as to reach the ground in the event of an emergency. Numerous additional features may also be provided in alternative arrangements to provide for more rapid and secure egress under emergency conditions from the vehicle for persons of different sizes or with different physical conditions and capabilities.

FIGS. 20-24 show an alternative exemplary arrangement of a ramp 178. The exemplary ramp 178 is movably mounted in a housing 180. Housing 180 may be generally similar to housing 30 previously described. For purposes hereof the components of the alternative housing 180 will be described using the same reference numbers as those used in connection with the housing 30 except in cases where the structures differ.

The alternative ramp 178 includes a base portion 182. The base portion 182 is comprised of a unitary piece of suitable material such as aluminum. In some exemplary arrangements the base portion 182 may include a non skid upper surface to facilitate walking thereon. The base portion 182 includes handles 184 that extend therethrough similar to the previously described arrangement. The exemplary ramp 178 further includes a pair of vertically extending end portions 186, 188. In the exemplary arrangement the end portions comprise longitudinally elongated reinforcing struts that are in attached connection with the base portion 182. In the exemplary arrangement the end portions extend in and are movable within the cross-sectional recesses bounded by the side rails 36, 38 and the respective plastic inserts therein. In the exemplary arrangement the reinforcing struts which bound the end portions have a uniform cross-sectional profile which provides additional resistance to bending and deformation due to loading of the ramp.

Figure 21:
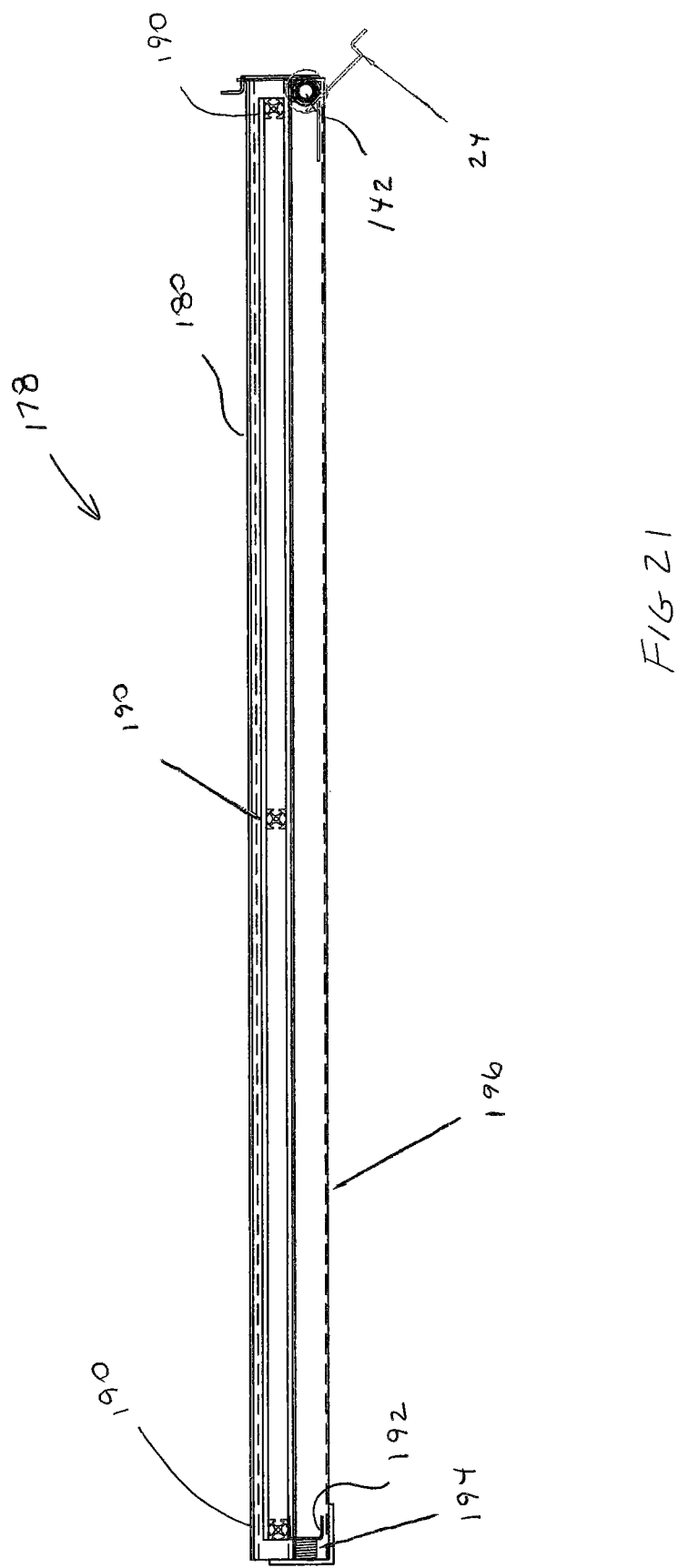
FIG. 21 is a side view of the alternative ramp and housing of FIG. 20.
Figure 22:
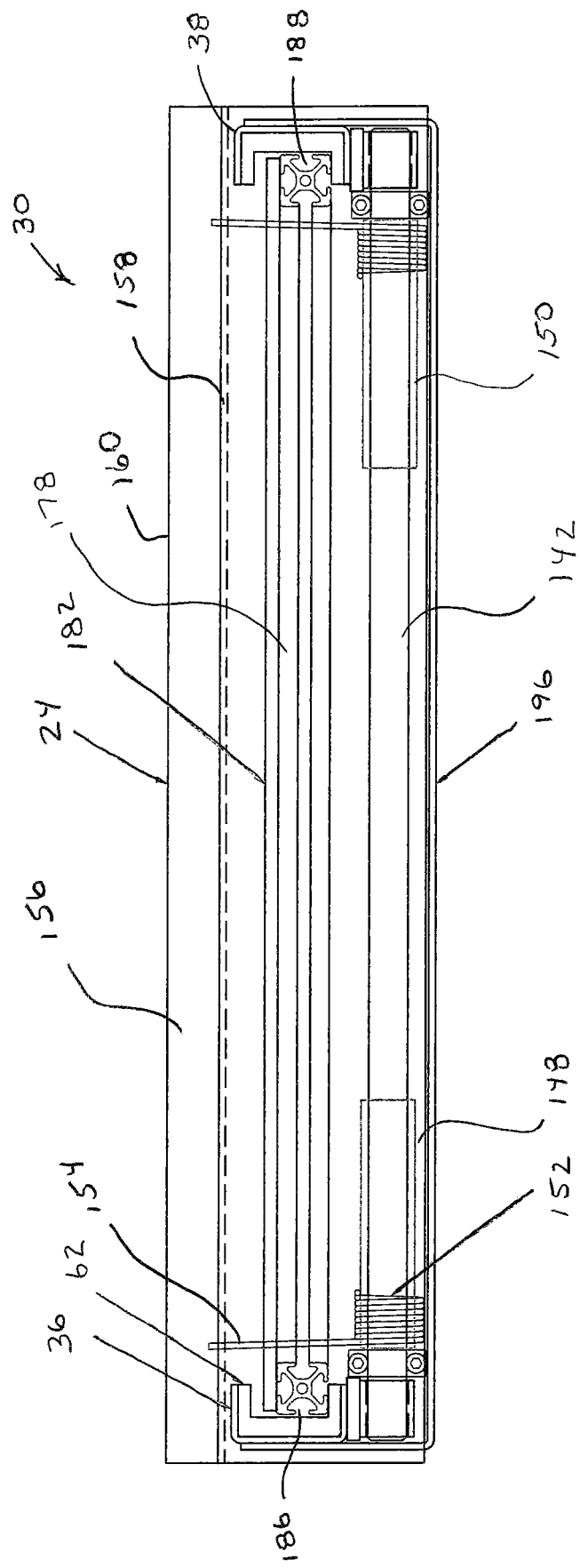
FIG. 22 is a rear view of the alternative ramp and housing.
Figure 23:
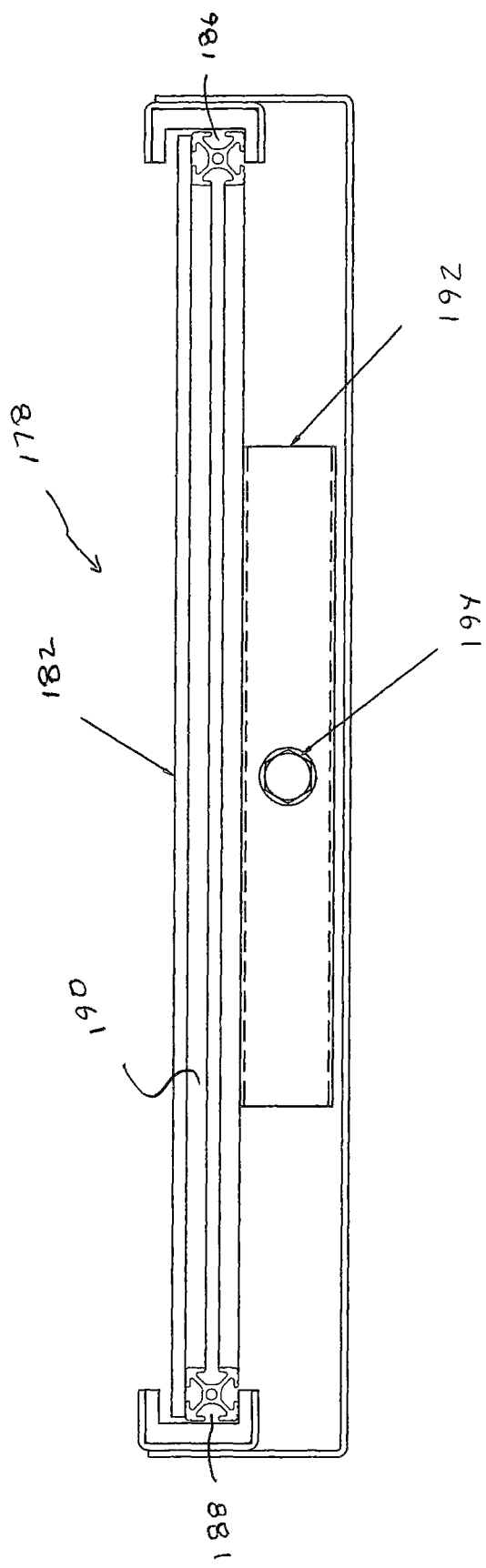
FIG. 23 is a front view of the alternative ramp and housing.

In the exemplary arrangement the ramp 178 further includes a plurality of transversely extending reinforcements 190. As shown in FIG. 21, in the exemplary arrangement the transverse reinforcements are positioned at the rear side and the front side of the ramp 178 as well as at the mid point thereof. The transverse reinforcements are held in engaged relation with the base portion and with the adjacent longitudinal reinforcing struts through welding or other fixed attaching methods. The transversely extending reinforcements 190 provide further rigidity and greater load carrying capability without deformation of the ramp 178. Of course it should be understood that this arrangement is exemplary and other configurations may be used.

The exemplary alternative ramp 178 is in operative connection with a ramp stop 192. The ramp stop 192 performs a function similar to the previously described ramp stop 70 in limiting the movement of the ramp outward from the housing to the extended position. The alternative stop 192 has a generally U-shaped cross section configuration that facilitates engagement with the shaft 142 and enables rotational movement of the ramp in engagement therewith. The stop 192 is also engageable with a compression spring 194. The compression spring 194 operates in a manner similar to spring 66 and biases the ramp from the retracted position toward the extended position.

In the exemplary arrangement the housing 180 is closed at its lower end by a panel 196. The exemplary panel 196 may comprise one or more planar panel segments that serve to limit the amount of dirt or other materials that may enter the interior area of the housing. The exemplary panel 196 in the exemplary arrangement helps to assure that dirt, debris, ice or other material will not accumulate within the housing in a manner that impedes the operation of the emergency egress system. In an exemplary arrangement, the panel 196 may be comprised of a lightweight material such as a plastic. However in other exemplary arrangements other arrangements and materials may be used. Further while in the exemplary arrangement the panel is configured to close the bottom of the housing, other arrangements may include closure panels at the front and/or top of the housing to further reduce the risk of infiltration of dirt or other debris. Further in exemplary arrangements sealing or gasketing material may be utilized for purposes of assuring that the panel or panels operate to maintain a liquid tight arrangement to prevent the infiltration of undesirable materials into the housing interior. Alternatively or in addition, suitable gasketing or other materials may also be utilized for purposes of sealing the abutting housing structures and the housing door 24 when the housing door is in the housing closing position. Of course these approaches are exemplary and other arrangements may be used.

FIGS. 25-28 show an alternative arrangement for mounting an exemplary ramp housing in fixed operative connection with the frame rails of a multi-passenger vehicle such as a school bus. FIGS. 25-28 show a frame attachment bracket 210. The exemplary frame attachment bracket includes a top piece 212 and a bottom piece 214. The exemplary top piece 212 in a vertical cross-section includes a vertically extending inner leg 216. The exemplary inner leg includes a vertically elongated opening 218. The top piece further includes a horizontally extending portion 220. The horizontally extending portion 220 extends transverse to the inner leg 216. Top piece 212 further includes a vertically extending outer leg 222. The outer leg 222 extends transverse to the horizontally extending portion 220 and downward generally parallel to the inner leg 216.

The exemplary bottom piece 214 includes a vertically extending inside leg 224. The inside leg 224 includes an opening 226. Horizontally extending portion 228 extends transverse to the inside leg 224. An outside leg 230 extends transverse to the horizontally extending portion 228 and upward generally parallel to the inside leg 224. As shown in FIG. 27 the top piece 212 and the bottom piece 214 are movably engageable with the openings 218 and 226 in overlapping relation. As shown in FIG. 27 with the top piece and the bottom piece in engagement, the pieces bound in vertical cross-section a frame rail accepting area 232. The frame rail accepting area 232 may be varied in its vertical dimension while maintaining openings 218 and 226 in overlapping relation.

Figure 28:
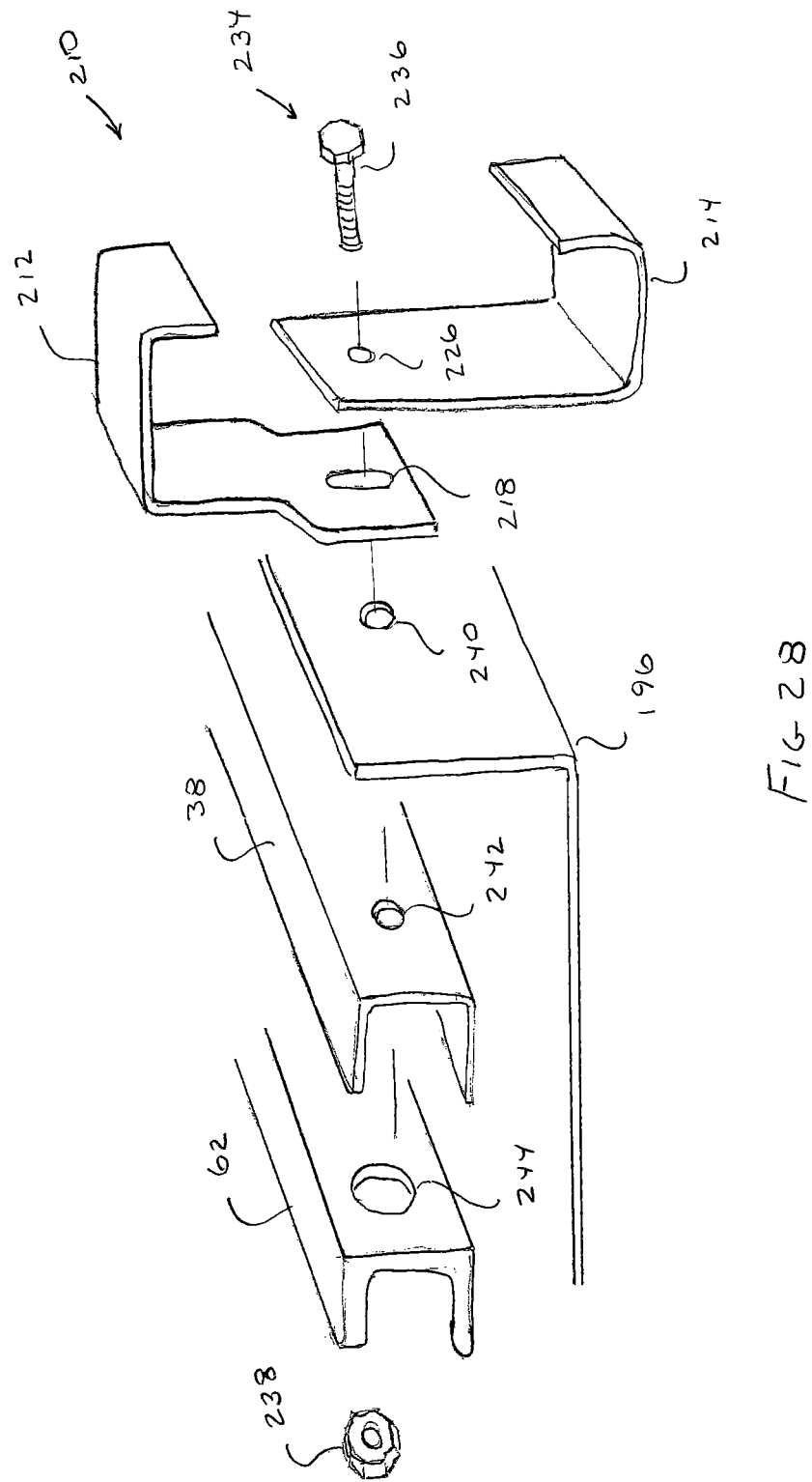
FIG. 28 is an exploded view of the exemplary frame attachment bracket and a portion of an exemplary ramp housing and side rail.

As shown in FIG. 28 the exemplary frame attachment bracket 210 further includes at least one fastener generally indicated 234. An exemplary arrangement the fastener includes a threaded bolt or stud 236 and a releasably engageable nut 238. In the exemplary arrangement the bolt extends through the opening 226 in the bottom piece 214 and the elongated opening 218 in the top piece 212. In an exemplary arrangement the fastener extends through an opening 240 in the cover panel 196. The fastener also extends through an opening 242 that extends through side rail 38 and into an aperture 244 in the plastic insert 62. In the exemplary arrangement the aperture 244 is sized so that the nut 238 of the fastener 234 may be selectively rotationally moved therein.

Figure 30:
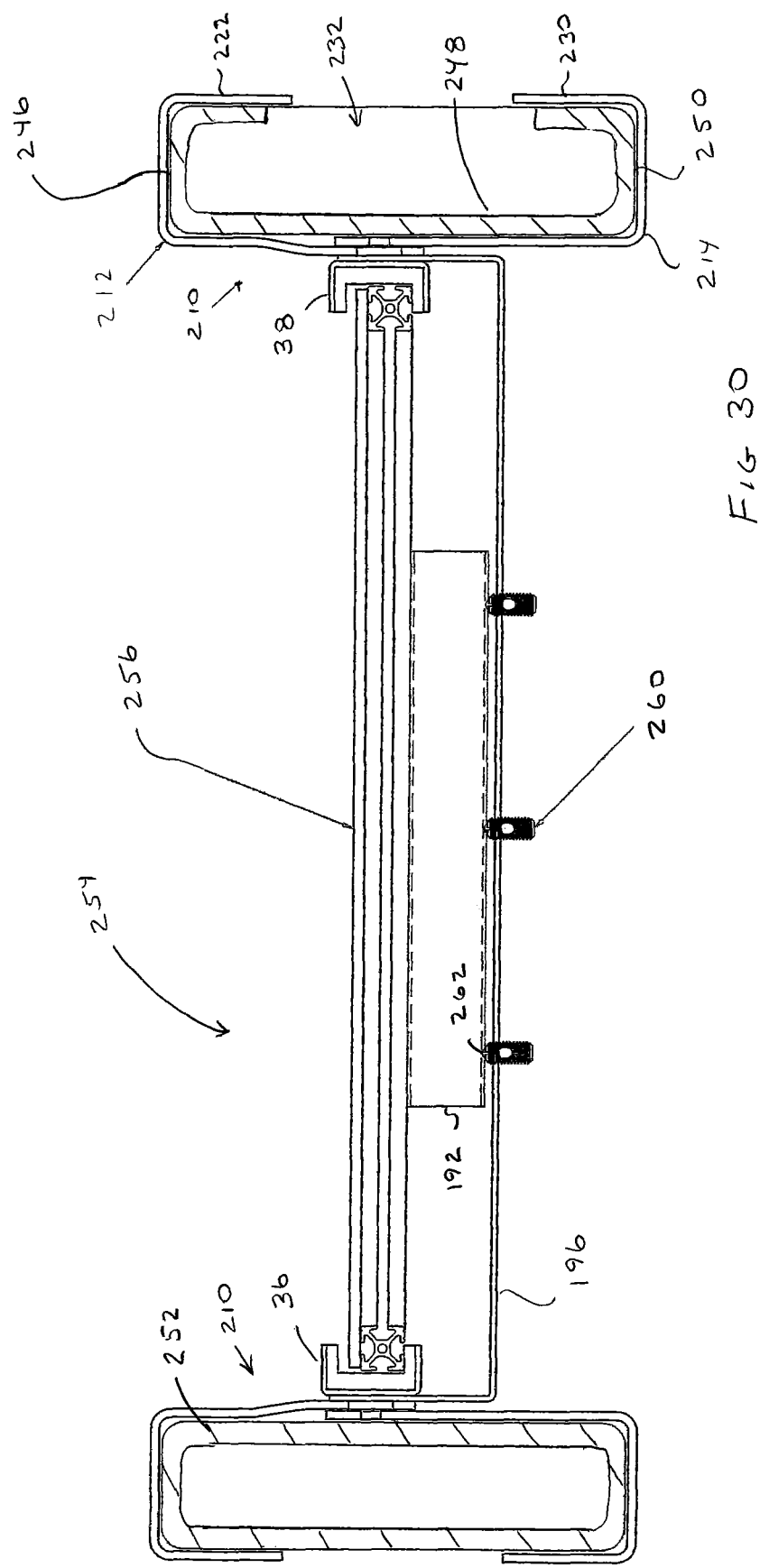
FIG. 30 is a front view of the alternative emergency egress system arrangement shown in FIG. 29.

In the exemplary arrangement of the frame attachment bracket 212 the nut of the fastener 234 can be rotationally positioned in a first position in which the top piece 212 and the bottom piece 214 are sufficiently loosely engaged so that the top piece and the bottom piece may be vertically movable relative to one another while being held in engagement. As represented in FIG. 30, in this first position of the fastener 234, the top piece 212 is selectively movable relative to the bottom piece and is engageable with a rail top 246 of an exemplary adjacent frame rail 248. Further in this first position of the fastener, the bottom piece 214 is engageable with a rail bottom 250 of the frame rail 248. As represented in FIG. 30 in the exemplary arrangement the top piece 212 is operative to engage the frame rail within the frame rail accepting area 232. Further in the exemplary arrangement the horizontally extending portion 220 of the top piece 212 and the horizontally extending portion 228 of the bottom piece 214 extend across the rail top and rail bottom of the frame rail 248, respectively. Further in the exemplary arrangement the outer leg 222 of the top piece and the outside leg 230 of the bottom piece are operative to hold the frame rail 248 in engagement with the bracket and in the frame rail accepting area 232.

As can be appreciated from FIG. 28, when the fastener 234 is moved to a second position by tightening the nut 238 in engaged relation with the threaded bolt or stud 236, the top piece 212 and the bottom piece 214 of the frame attachment bracket 212 are held in fixed engaged relation. As a result the frame rail 248 is held in fixed operatively engaged relation with the frame attachment bracket and the ramp housing components attached thereto.

In exemplary arrangements the frame attachment bracket 210 is configured to be engageable with a plurality of different sized frame rails. Such different frame rails may have different vertical dimensions. However such different sized frame rails may be engaged with an adjacent frame attachment bracket 210 by changing the vertical distance between the horizontally extending portions of the top piece 212 and the bottom piece 214. Further as can be appreciated, the exemplary frame attachment bracket is configured to engage different configurations of frame rails. For example bracket 210 may be attached in fixed engagement to a frame rail that includes a C shape cross-section like frame rail 248. Also as can be appreciated frame rails 28 discussed in connection with previous arrangements also include a C shape cross-section. Further as shown in FIG. 30, alternative frame rails such as a full box frame rail 252 nonetheless includes a C shape portion in vertical cross-section which can be engaged by the exemplary frame attachment bracket 210. Of course it should be understood that this bracket arrangement is exemplary and other arrangements that utilize the principles described herein may be utilized for engaging exemplary ramp housings in operatively fixed engagement with the frame rails of a vehicle.

In the exemplary arrangements a plurality of frame attachment brackets 210 may be longitudinally disposed on each lateral side of a ramp housing, such as housing 254 shown in FIG. 30, to hold the housing in operatively fixed engaged relation with the frame rails of the vehicle. In some arrangements the number and lateral spacing of the frame attachment brackets will depend on the length and weight of the housing structure and the ramp. Further as can be appreciated the exemplary frame attachment brackets may be further modified through the use of elongated openings in place of opening 226 and/or one or more elongated openings, to provide vertical adjustability of the housing for the ramp. As can be appreciated, through the inclusion of vertically elongated openings in each of the inner leg and inside leg of the top piece 212 and bottom piece 214 respectively, the vertical location of each of the side rails 36 and 38 of the ramp housing may be adjusted so as to be suitably aligned with a ramp opening in the body of the vehicle through which the ramp may extend. Thus such vertical adjustment enables positioning of the housing opening and the ramp access door so as to be in a suitable operative position to enable operation in conjunction with an emergency exit door of the particular vehicle configuration.

Further in exemplary arrangements the frame attachment bracket 210 may be attached to suitable lateral spacers so as to achieve mounting of the ramp housing 254 horizontally intermediate of frame rails that may be spaced horizontally at a distance greater than the horizontal width of the ramp housing. Such spacers may include suitable sized blocks, strips, bushings, washers, shims or similar structures. Of course numerous different approaches may be taken utilizing the features described to achieve suitable mounting of the ramp housing on the particular vehicle.

Figure 29:
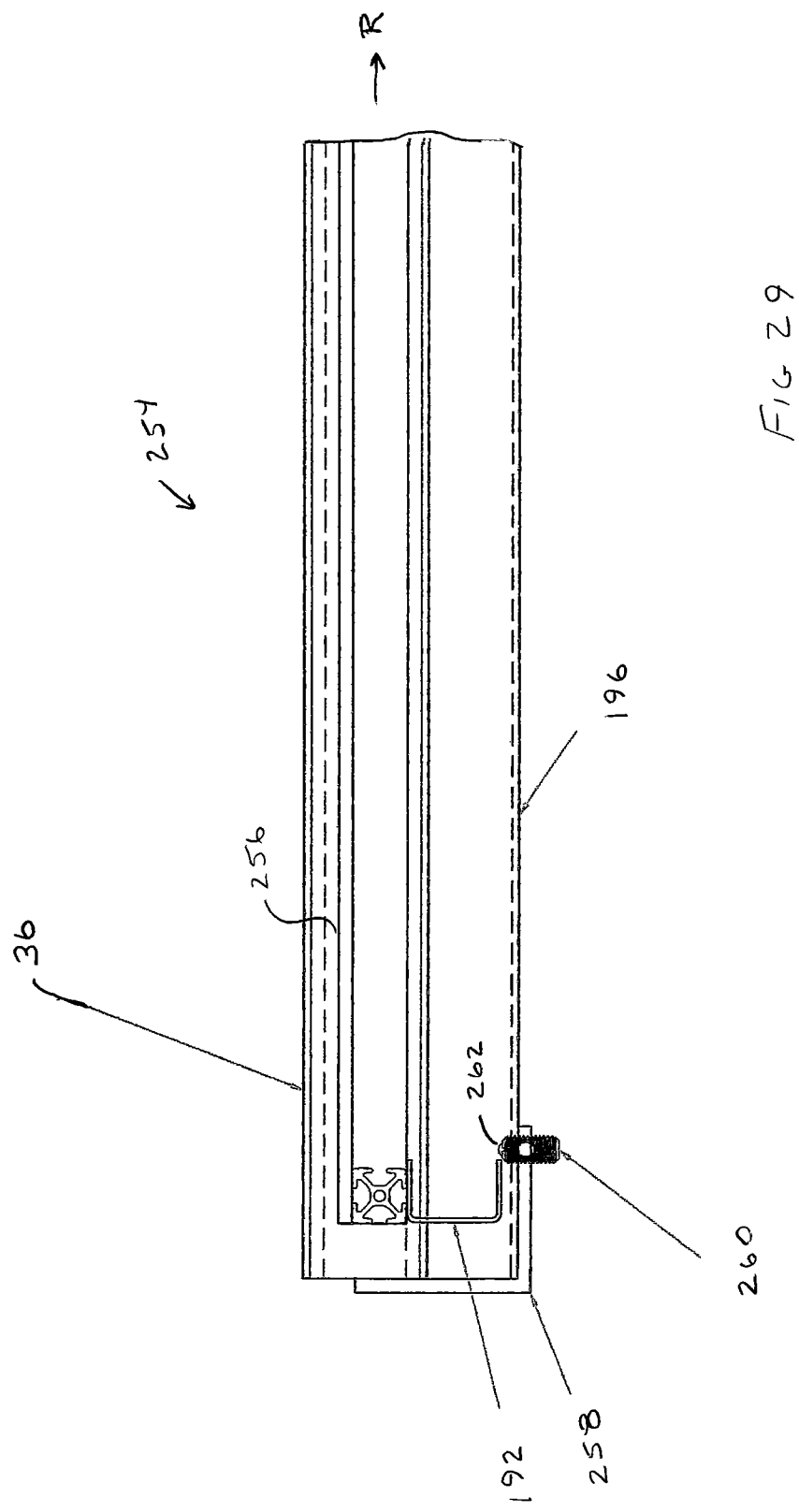
FIG. 29 is a side view of a housing and ramp of an alternative emergency egress system arrangement.

FIGS. 29 and 30 show a further alternative exemplary arrangement of an extendable ramp 256 that is housed within ramp housing 254. The exemplary ramp and ramp housing may be similar to those discussed previously in connection with ramp housing 180. However, ramp 256 is configured so that it is not automatically moved outward from the housing through the ramp opening when the ramp access door is opened. Such a configuration may be useful in situations where it is desired that the operator of the vehicle deliberately act to move the ramp from the retracted position toward the extended position so as to cause the ramp to be deployed.

FIG. 29 is a view similar to FIG. 24 and showing the ramp housing 254 and ramp 256. Similar to ramp 178, ramp 256 includes a stop 192 attached thereto. In the exemplary arrangement the stop 192 limits the outward movement of the ramp 256. However in the exemplary arrangement housing member 258 includes a plurality of detents thereon. In the exemplary arrangement each of the detents 260 is in threadably engaged relation with the housing member 258 so as to be selectively vertically positionable to engage the lower rearward facing leading surface of the stop 192. In the exemplary arrangement each detent 260 includes an outwardly biased upward facing spring-loaded ball 262. Of course in other arrangements other types and configurations of detents may be used. Each detent 260 is operative to hold the ramp 256 through engagement with the stop 192, in the retracted position. However when a release force schematically indicated R in FIG. 29 is applied to the ramp 256, the force of the detents 260 holding the ramp in the retracted position is overcome, and the ramp is released to move toward the extended position.

In exemplary arrangements in which the ramp configuration shown in FIGS. 29 and 30 is utilized, the end of the ramp including the handles may be accessed in the retracted position when the ramp door is open, through the ramp opening and the open end at the back of the housing. The ramp and ramp handle such as handles 184 may become accessible as a result of the ramp access door automatically moving to the door open position responsive at least in part to the emergency exit door being in the openable position or being open. Alternatively in some arrangements which are later discussed, the ramp access door may be manually opened by a bus driver or other vehicle operator. With the ramp access door in the open position the operator is enabled to access the ramp handles through the ramp access opening and apply the release force to the ramp. Applying a force at least as great as the release force toward the extended position causes the ramp to move from the retracted position, overcoming the holding force of the detents, and moves the ramp towards the extended position. Also as can be appreciated, when the ramp is to be returned from the extended position to the retracted position the ramp may be moved sufficiently inward so that the stop 192 is again engaged with the detents. This may be accomplished in some exemplary configurations by having the ramp and the ramp access opening and door configured so that the door cannot be closed until the ramp is moved to the retracted position. Of course it should be understood that this approach is exemplary and in other arrangements other approaches may be used.

Figure 32:
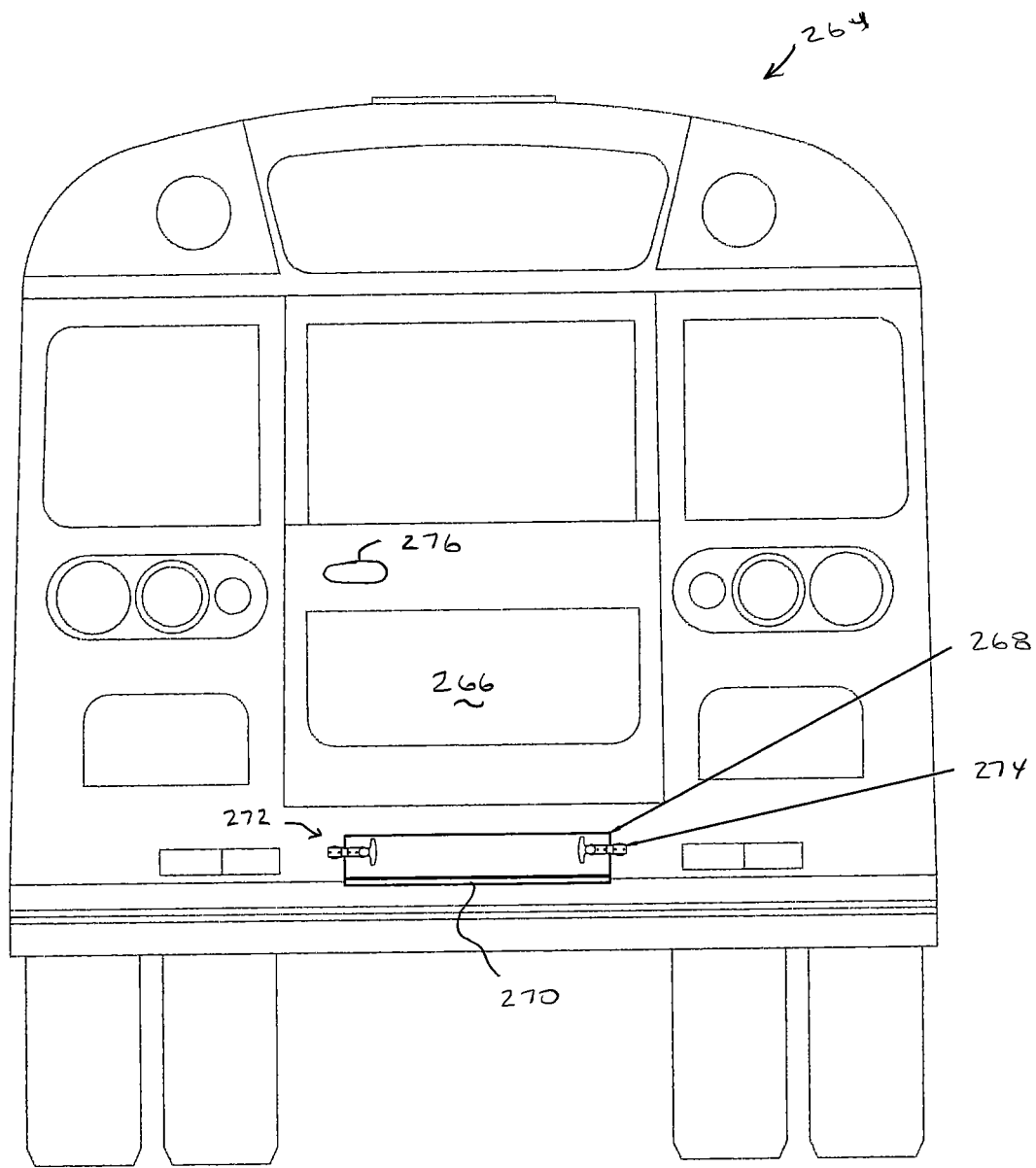
FIG. 32 is a rear view of an alternative multi-passenger vehicle such as a school bus including an alternative ramp access arrangement.

FIG. 32 shows an alternative multi-passenger vehicle such as a bus 264 which includes a further alternative arrangement of an emergency egress system. In this exemplary arrangement a ramp and ramp housing that may be similar to those previously described, are extendable below an emergency exit door 266. However in this exemplary arrangement, the ramp access door 268 is not in operative engagement with the emergency exit door 266. In this exemplary arrangement the ramp access door 268 is rotatable about a horizontally elongated hinge 270. Opening the ramp access door 268 enables access through a ramp opening through the body of the bus (behind the closed door 268 in FIG. 32) to access the ramp. In this exemplary arrangement the ramp access door is held in the closed position by a pair of manually releasable latches 274. In this exemplary arrangement the vehicle operator or other person is enabled to access the ramp by releasing the latches 274 and opening the ramp access door 268. The operator may then move the ramp to the extended position. In some such arrangements opening the ramp access door and/or extending the ramp may cause the bus suspension to be lowered in a manner like that previously discussed. This ramp access configuration may be used for example by an operator who uses the ramp in the deployed position to access a handle 276 or other actuator to open the emergency exit door 266 from the outside. Also as can be appreciated in this exemplary arrangement, the ramp access door 268 is positioned so that a ramp access door having a configuration that automatically opens in response to opening of the emergency exit door of the type previously described could be utilized. Of course it should be understood that this configuration is exemplary and in other arrangements other approaches may be used.

Figure 33:
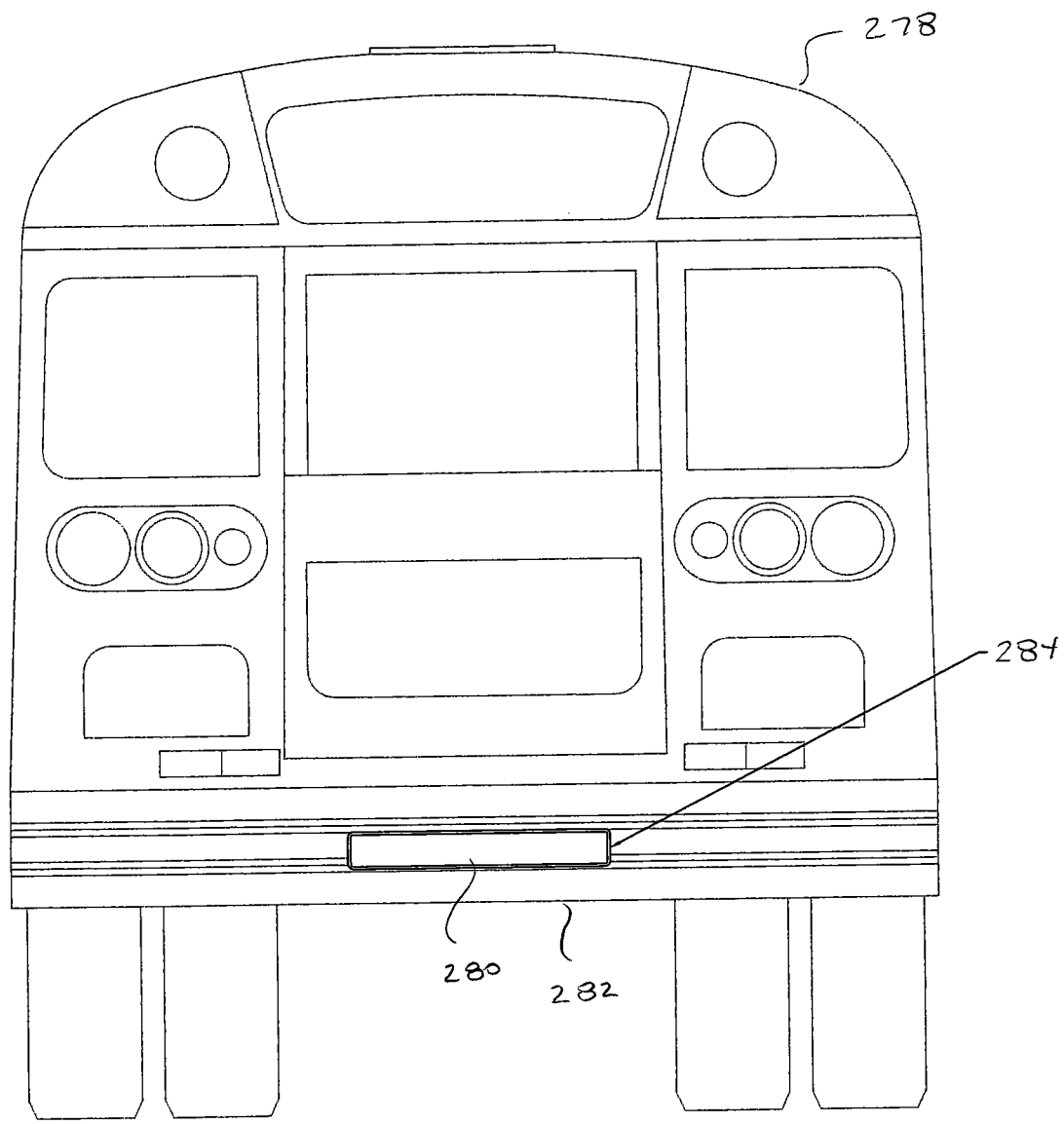
FIG. 33 is a rear view of an alternative multi-passenger vehicle such as a school bus including a ramp sleeve that includes a ramp opening that extends through a bumper of the vehicle.
Figure 34:
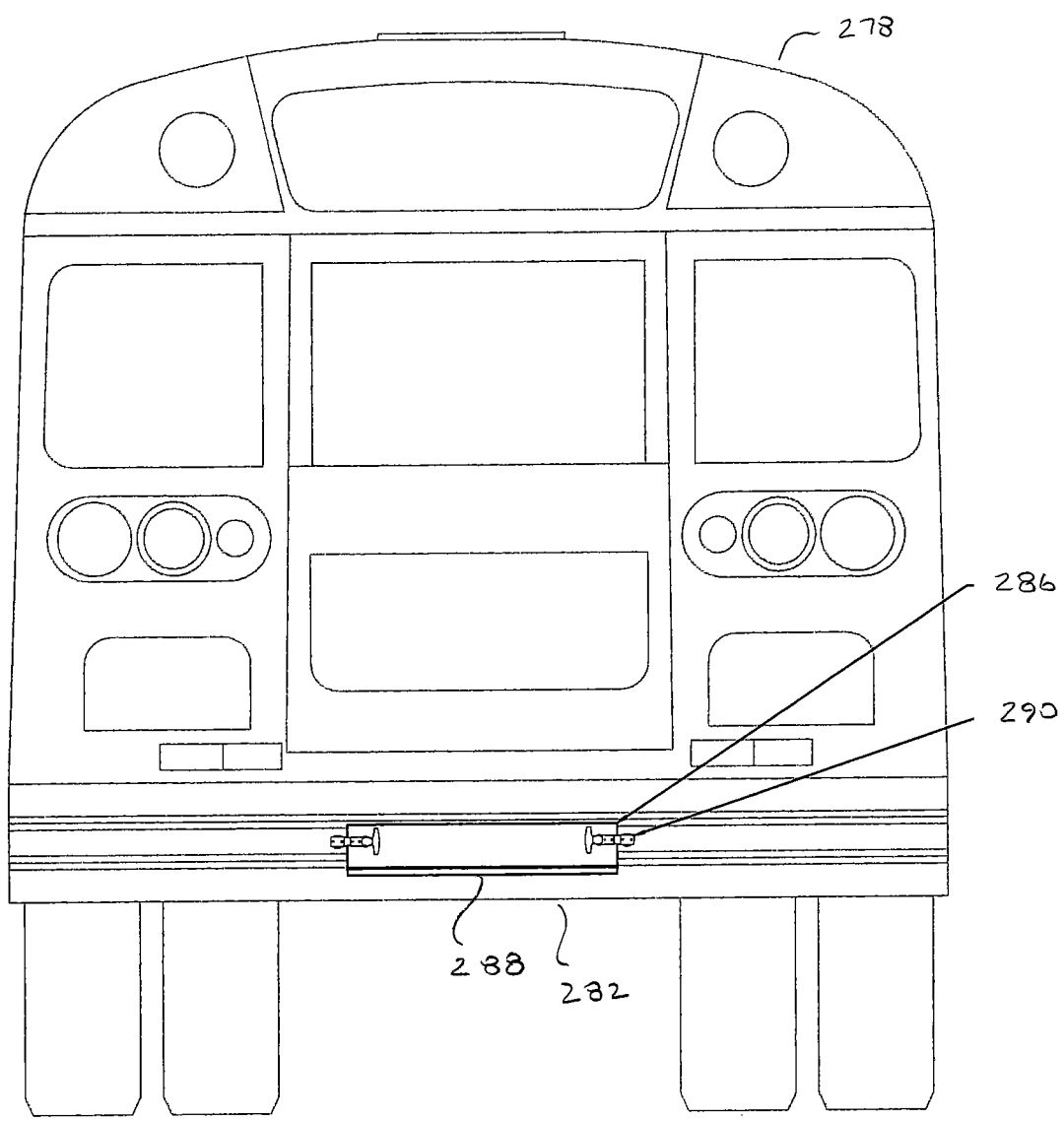
FIG. 34 is a rear view of the vehicle shown in FIG. 33 including an alternative ramp access door installed in overlying relation of the ramp opening.

FIGS. 33 and 34 show yet another multi-passenger vehicle such as a bus 278. Bus 278 includes a further alternative emergency egress system. In this alternative emergency egress system the ramp is deployable through a ramp access opening 280 that extends through a bumper 282 of the vehicle. In this exemplary arrangement a rectangular sleeve 284 is positioned in the ramp access opening. In the exemplary arrangement the sleeve 284 is comprised of a steel or other suitably rigid material construction that is welded or otherwise put in place so as to maintain the structural rigidity of the bumper 282. In this exemplary arrangement a ramp access door 286 is movably mounted about a hinge 288 to enable selectively opening and closing the ramp access opening 280. In this exemplary arrangement a pair of latches 290 are used to hold the ramp access door 286 in the closed position. Similar to the previously described arrangement, the latches are utilized to hold the ramp access door 286 in the closed position during normal bus operation. When it is desired to deploy the ramp (and also in some exemplary arrangements also automatically lower the bus suspension) the latches 290 may be released and the access door 286 moved to the door open position. This enables accessing the ramp and moving it from the retracted position to the extended position to provide suitable egress from the emergency exit. Of course as with the other described arrangement, suitable structures for automatically opening the ramp access door responsive to the emergency exit door being in the openable position may alternatively be provided in exemplary arrangements of this type where the ramp access opening extends through a portion of the vehicle bumper.

In some exemplary arrangements it may be desirable for the operator of the bus or other vehicle to be aware whenever the emergency exit door or ramp access door may be unsecured or in the open position. This may be particularly useful in situations where the ramp has been used or tested by being extended, and then must be returned to the retracted position. In some exemplary arrangements in which the ramp access door opens responsive to the emergency exit door becoming openable, the emergency exit door may be closed without closing the ramp access door. This may be undesirable in some circumstances as it may enable the ramp to be accessed or moved toward the extended position by unauthorized persons. However even in circumstances where the ramp is accessible and only movable manually, it may be desirable for the vehicle operator to know when the door that enables access to the ramp is in the open or unsecured position.

Figure 31:
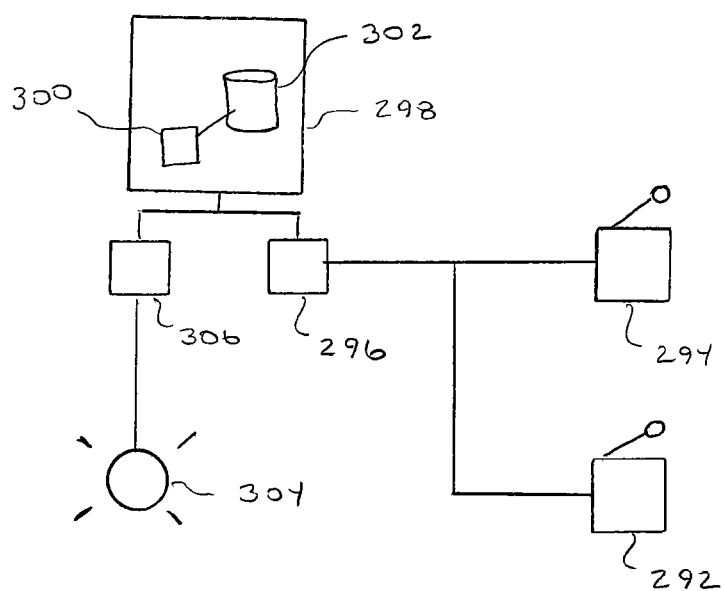
FIG. 31 is a schematic view of the exemplary circuitry for alerting a driver of the vehicle that the emergency exit door or ramp access door is in an unsecured position.

FIG. 31 is a schematic arrangement showing an arrangement for detecting and indicating to the vehicle operator when either the emergency exit door or the ramp access door is in an unsecured position. In the exemplary arrangement an electrical switch 292 is in operative connection with the ramp access door. In exemplary arrangements the switch 292 may be a plunger switch, rocker switch or other suitable switch for detecting the position of the ramp access door. The switch may be operative to detect that the ramp access door is not closed, and thereby in the unsecured position. Alternatively in other exemplary arrangements switch 292 may comprise a photosensor switch, magnetic switch or other contact or non-contact switch that is suitable for detecting the position of the ramp access door.

A switch 294 is in operative connection with the emergency exit door. Switch 294 may be of a switch type similar to switch 292. Switch 294 is operative to detect that the emergency exit door is in an openable condition. This may be done by the switch detecting a position of a surface of the door or by detecting a position of the latch or other engaging member that is operative to hold the door closed or to enable movement of the door to an open position. Numerous different types of switches may be utilized for this purpose.

In the exemplary arrangement switches 292 and 294 are in operative connection with at least one interface 296. At least one interface 296 comprises circuitry that enables the signals from the switches to be utilized to communicate with a controller 298. In exemplary arrangements the controller 298 comprises circuitry which is operative to receive signals indicative of the condition of the switches and to provide appropriate output signals in response thereto. In exemplary arrangements the controller 298 may include circuitry such as a processor 300 and one or more data stores 302. In exemplary arrangements circuitry associated with controller 298 may operate responsive to circuit executable instructions included in the at least one data store 302 to cause signals to be output responsive to input signals corresponding to certain programmed conditions.

The exemplary arrangement further includes at least one output device 304. The at least one output device may include a visual output device such as a flashing light or an audible output device such as a warning siren or beeper. The exemplary at least one output device is in operative communication with the controller 298 through one or more suitable interfaces schematically indicated 306.

In operation of the exemplary arrangement if either of the switches 292 or 294 are operative to detect that the emergency exit door is openable or the ramp access door is not closed or otherwise secured, the circuitry of controller 298 is operative to cause the at least one output device 304 to provide an indication thereof. In some exemplary arrangements the controller 298 may operate to provide the indication only at selected times during vehicle operation. This may include for example providing a warning output in the event that the operator places the transmission of the bus or other vehicle in drive when the emergency exit door or ramp access door is not secured. Of course it should be understood that the controller or other suitable circuitry may provide detectable outputs to the operator at other times or under other circumstances during vehicle operation. Thus in the exemplary arrangement the operator of the vehicle is alerted in the event that the driver commences certain operations of the vehicle without both the ramp access door and the emergency exit door being suitably secured. Of course it should be understood that this arrangement is exemplary and other arrangements other approaches may be used.

Thus the exemplary arrangements achieve improved operation, eliminate difficulties encountered in the use of prior devices and systems, and obtain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the exact features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

Having described the features, discoveries and principles of the exemplary arrangements, the manner in which they are constructed and operated, and the advantages and useful results attained; the new and useful structures, devices, elements, arrangements, parts, combinations, systems, equipment, operations, methods, processes and relationships are set forth in the appended claims.

I claim:

1. Apparatus operative to provide emergency egress for persons from an interior area of a bus,
    the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the emergency exit opening, and an openable condition in which the emergency exit door is changeable between the closed position and an open position in which at least a portion of the door is movable away from the emergency exit opening, the apparatus comprising:

a housing, wherein the housing is in operatively fixed connection with the bus and is positioned adjacent to a bottom of the emergency exit opening,
  wherein the housing includes a ramp opening,
  wherein the ramp opening is positioned in horizontal alignment with at least a portion of the emergency exit opening, a ramp,
  wherein the ramp is movable in operatively supported connection within the housing,
  wherein the ramp is movable between a retracted position in which the ramp is within the housing and is fully disposed away from ground, and an extended position in which the ramp extends through the ramp opening to ground, a movable door portion,
  wherein the moveable door portion is configured to prevent external access to the ramp opening and is movably mounted in operatively supported connection with the bus,
  wherein the movable door portion is movable between
    a closed position wherein the ramp is not externally accessible through the ramp opening, and
    an open position wherein the movable door portion door is disposed away from at least a portion of the ramp opening and the ramp is extendable outward from the housing through the ramp opening,
    wherein the movable door portion is in operative connection with the emergency exit door, such that the movable door portion is operative to move from the closed position to the open position responsive at least in part to the emergency exit door being in the openable condition.

2. The apparatus according to claim 1
wherein the movable door portion is in operative connection with an extension that extends above the housing, wherein the extension operatively engages the emergency exit door.

3. The apparatus according to claim 1
wherein the movable door portion is in operative connection with an extension that in the door closed position extends above the ramp opening, wherein the extension operatively engages the emergency exit door,
wherein the extension includes a horizontal extension portion and a vertical extension portion,
wherein in the closed position the horizontal extension portion extends horizontally in the emergency exit opening, and the vertical extension portion engages a face of the emergency exit door,
wherein movement of the emergency exit door to the open position is operative to enable the movable door portion to move from the closed position to the open position.

4. The apparatus according to claim 1
wherein the bus includes a pair of disposed frame rails and a tire supported axle,
wherein at least one pneumatic spring extends operatively vertically between the frame rails and the axle,
and further comprising an air valve,
  wherein the air valve is in operative fluid connection with the at least one pneumatic spring, wherein the air valve is changeable between open and closed conditions,
  wherein the air valve is operative to change from the closed condition to the open condition, responsive at least in part to at least one of the emergency exit door being in the openable condition and ramp displacement from the retracted position toward the extended position,
  whereby air is released from the at least one pneumatic spring and the emergency exit opening is moved closer to ground.

5. The apparatus according to claim 1
and further including
at least one detent, wherein the at least one detent is in operative connection with the ramp,
wherein the at least one detent is operative to hold the ramp in the retracted position and to release the ramp from the retracted position and enable ramp movement toward the extended position responsive to a release force that acts to move the ramp toward the extended position.

6. The apparatus according to claim 1
wherein the bus includes a pair of horizontally disposed frame rails,
wherein each frame rail includes a rail top and a rail bottom,
wherein the housing is positioned horizontally intermediate of the frame rails,
and further comprising:
at least one frame attachment bracket, wherein the at least one frame attachment bracket is operative to hold the housing in fixed operative connection with at least one of the frame rails,
wherein each frame attachment bracket includes
  a top piece, a bottom piece and at least one fastener,
    wherein the top piece and the bottom piece are vertically movable relative to one another in engaged relation when the at least one fastener is in a first position, and are in fixed engaged relation with one another when the at least one fastener is in a second position,
wherein the top piece of each frame attachment bracket is in engaged relation with the rail top of the adjacent frame rail and the bottom piece of the respective frame attachment bracket is in engaged relation with the rail bottom of the adjacent frame rail, and the at least one fastener of the respective frame attachment bracket is in the second position,
whereby each frame attachment bracket is in fixed engagement with the respective adjacent frame rail.

7. The apparatus according to claim 1
wherein the bus includes a pair of horizontally disposed frame rails, wherein in vertical cross-section each frame rail includes a C-shaped profile,
wherein in vertical cross-section each frame rail includes a horizontally extending rail top and a horizontally extending rail bottom,
wherein the housing is positioned horizontally intermediate of the frame rails,
and further comprising:
at least one frame attachment bracket, wherein the at least one frame attachment bracket is operative to hold the housing in fixed operative connection with at least one of the frame rails,
wherein each frame attachment bracket includes
  a top piece, a bottom piece and at least one fastener,
    wherein the top piece extends vertically on each horizontal side of an adjacent frame rail and horizontally across the rail top of the adjacent frame rail,
    wherein the bottom piece extends on each horizontal side of the adjacent frame rail and horizontally across the rail bottom of the adjacent frame rail, wherein the top piece and the bottom piece are vertically movable relative to one another in engaged relation when the at least one fastener is in a first position, and are in fixed engaged relation with one another when the at least one fastener is in a second position, wherein the top piece of each frame attachment bracket is in engaged relation with the rail top of the adjacent frame rail and the bottom piece of the respective frame attachment bracket is in engaged relation with the rail bottom of the adjacent frame rail, and the at least one fastener of the respective frame attachment bracket is in the second position, whereby each frame attachment bracket is in fixed engagement with the respective adjacent frame rail.

8. The apparatus according to claim 1 and further comprising:
an electrical switch, wherein the electrical switch is in operative connection with the movable door portion,
at least one indicator, wherein the at least one indicator is operative to give a visual or audible output,
a circuit, wherein the circuit is in operative connection with the electrical switch and the at least one indicator,
wherein the at least one indicator is operative to provide an output responsive at least in part to the electrical switch detecting that the movable door portion is in the open position.

9. The apparatus according to claim 1 and further comprising:
an electrical switch, wherein the electrical switch is in operative connection with the movable door portion,
a further electrical switch, wherein the further electrical switch is in operative connection with the emergency exit door,
at least one indicator, wherein the at least one indicator is operative to give at least one of a visual or audible output,
a circuit, wherein the circuit is in operative connection with the electrical switch, the further electrical switch and the at least one indicator,
wherein the at least one indicator is operative to provide an output responsive at least in part to at least one of the electrical switch detecting the movable door portion in the open position and the further electrical switch detecting the emergency exit door in the openable position.

10. The apparatus according to claim 1 wherein the ramp is in operative connection with a stop, wherein the stop is operative to prevent the ramp from moving outward beyond the extended position.

11. The apparatus according to claim 1 wherein the ramp includes at least one manually engageable handle, wherein the at least one handle is accessible through the ramp opening when the ramp is in the retracted position.

12. Apparatus operative to provide emergency egress for persons from an interior area of a bus,
the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the opening, and an openable condition in which the emergency exit door is changeable between the closed position and an open position in which at least a portion of the door is movable away from the opening, and wherein the bus further includes
a pair of horizontally disposed, longitudinally extending frame rails wherein the emergency exit opening is positioned vertically higher than the frame rails,
a tire supported axle and at least one pneumatic spring, wherein the at least one pneumatic spring operatively extends in vertically intermediate relation of the frame rails and the tire supported axle, the apparatus comprising:
a housing,
wherein the housing is in operatively fixed connection with the bus,
wherein the housing includes a ramp opening,
wherein the ramp opening is positioned adjacent to a bottom of the emergency exit opening and in horizontal alignment with at least a portion of the emergency exit opening,
a ramp,
wherein the ramp is movable in operatively supported connection within the housing,
wherein the ramp is movable between a retracted position in which the ramp is within the housing and is fully disposed away from ground, and an extended position in which the ramp extends through the ramp opening to ground,
a movable door portion,
wherein the movable door portion is configured to prevent external access to the ramp opening and is movably mounted in operatively supported connection with the bus,
wherein the movable door portion is movable between
a closed position, wherein the ramp is not externally accessible through the ramp opening, and
an open position, wherein the movable door portion is disposed away from at least a portion of the ramp opening and the ramp is extendable outward from the ramp opening,
wherein the movable door portion is in operative connection with the emergency exit door, wherein the movable door portion is operative to move from the closed position to the open position responsive at least in part to the emergency exit door being in the openable position,
an air valve,
wherein the air valve is in operative fluid connection with the at least one pneumatic spring, wherein the air valve is changeable between an open condition and a closed condition,
wherein the air valve is in operative connection with at least one of the emergency exit door or the ramp, wherein the air valve is operative to change from the closed condition to the open condition responsive at least in part to at least one of the emergency exit door being in the openable condition, the emergency exit door being opened or movement of the ramp toward the extended position,
whereby air is released from the at least one pneumatic spring, and the emergency exit opening is moved closer to ground.

13. The apparatus according to claim 12
wherein the movable door portion is in operative connection with an extension that in the closed position extends above the ramp opening, wherein the extension operatively engages the emergency exit door,
wherein movement of the emergency exit door from the closed position toward the open position is operative to enable the movable door portion to move from the closed position to the open position.

14. The apparatus according to claim 12 and further including
at least one detent, wherein the at least one detent is in operative connection with the ramp,
wherein the at least one detent is operative to hold the ramp in the retracted position and to release the ramp from the retracted position and enable ramp movement toward the extended position responsive to a release force that acts to move the ramp toward the extended position.

15. The apparatus according to claim 12
wherein each frame rail includes a rail top and a rail bottom,
wherein the housing is positioned horizontally intermediate of the frame rails,
and further comprising:
at least one frame attachment bracket, wherein the at least one frame attachment bracket is operative to hold the housing in fixed operative connection with at least one of the frame rails,
wherein each frame attachment bracket includes
a top piece, a bottom piece and at least one fastener,
wherein the top piece and the bottom piece are vertically movable relative to one another in engaged relation when the at least one fastener is in a first position, and are in vertically fixed engaged relation with one another when the at least one fastener is in a second position,
wherein the top piece of each frame attachment bracket is in engaged relation with the rail top of an adjacent frame rail and the bottom piece of the respective frame attachment bracket is in engaged relation with the rail bottom of the adjacent frame rail, and the at least one fastener of the respective frame attachment bracket is in the second position,
whereby each frame attachment bracket is in fixed engagement with the respective adjacent frame rail.

16. The apparatus according to claim 12 and further comprising:
an electrical switch, wherein the electrical switch is in operative connection with the movable door portion,
at least one indicator, wherein the at least one indicator is operative to give at least one of a visual or audible output,
a circuit, wherein the circuit is in operative connection with the electrical switch and the at least one indicator,
wherein the at least one indicator is operative to provide an output responsive at least in part to the electrical switch detecting that the movable door portion is in the open position.

17. The apparatus according to claim 12 and further comprising:
an electrical switch, wherein the electrical switch is in operative connection with the movable door portion,
a further electrical switch, wherein the further electrical switch is in operative connection with the emergency exit door,
at least one indicator, wherein the at least one indicator is operative to give at least one of a visual or audible output,
a circuit, wherein the circuit is in operative connection with the electrical switch, the further electrical switch and the at least one indicator,
wherein the at least one indicator is operative to provide an output responsive at least in part to at least one of the electrical switch detecting the movable door portion in the open position and the further electrical switch detecting the emergency exit door in the openable condition.

18. The apparatus according to claim 12
wherein the ramp is in operative connection with a stop, wherein the stop is operative to prevent the ramp from moving outward beyond the extended position.

19. The apparatus according to claim 12
wherein the ramp includes at least one manually engageable handle, wherein the at least one handle is accessible through the ramp opening when the ramp is in the retracted position.

20. Apparatus operative to provide emergency egress for persons from an interior area of a bus,
the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the opening, and an openable condition in which the emergency exit door is changeable between the closed position and an open position in which at least a portion of the door is movable away from the opening,
the apparatus comprising:
a housing,
wherein the housing is in operatively fixed connection with the bus,
wherein the housing includes a housing open end,
wherein the bus includes a ramp opening,
wherein the ramp opening is positioned adjacent to a bottom of the emergency exit opening and in horizontal alignment with at least a portion of the emergency exit opening,
a ramp,
wherein the ramp is movable in operatively supported connection within the housing,
wherein the ramp is movable between a retracted position in which the ramp extends within the housing and is fully disposed away from ground, and an extended position in which the ramp extends through the ramp opening to ground,
a movable door portion,
wherein the movable door portion is movably mounted in operatively supported connection with the bus,
wherein the movable door portion is movable between
a closed position wherein the movable door portion prevents external access to the ramp through the ramp opening, and
an open position wherein at least a portion of the movable door portion is disposed sufficiently away from at least a portion of the ramp opening such that the ramp is extendable outward from the ramp opening,
wherein the movable door portion is in operative connection with the emergency exit door, wherein the movable door portion is operative to move from the closed position to the open position responsive at least in part to the emergency exit door being in the openable condition.

* * * * *